(12) United States Patent
Idgunji et al.

(10) Patent No.: US 10,852,811 B2
(45) Date of Patent: Dec. 1, 2020

(54) VOLTAGE/FREQUENCY SCALING FOR OVERCURRENT PROTECTION WITH ON-CHIP ADC

(71) Applicant: NVIDIA Corporation, Santa Clara, CA (US)

(72) Inventors: Sachin Idgunji, San Jose, CA (US); Ben Pei En Tsai, San Jose, CA (US); Jun (Alex) Gu, San Jose, CA (US); James Reilley, San Jose, CA (US); Thomas E. Dewey, Menlo Park, CA (US)

(73) Assignee: NVIDIA Corporation, Santa Clara, CA (US)

( * ) Notice: Subject to any disclaimer, the term of this patent is extended or adjusted under 35 U.S.C. 154(b) by 70 days.

(21) Appl. No.: 16/049,916

(22) Filed: Jul. 31, 2018

(65) Prior Publication Data
US 2020/0042076 A1 Feb. 6, 2020

(51) Int. Cl.
*G06F 1/3296* (2019.01)
*G06T 1/20* (2006.01)
*H04J 3/00* (2006.01)

(52) U.S. Cl.
CPC .............. *G06F 1/3296* (2013.01); *G06T 1/20* (2013.01); *H04J 3/00* (2013.01)

(58) Field of Classification Search
CPC .................................................... G06F 1/3296
See application file for complete search history.

(56) References Cited

U.S. PATENT DOCUMENTS

| | | | |
|---|---|---|---|
| 2011/0314314 A1* | 12/2011 | Sengupta .............. | G06F 1/3228 713/323 |
| 2014/0189376 A1* | 7/2014 | Rotem .................... | G06F 1/206 713/300 |
| 2015/0148981 A1* | 5/2015 | Kong .................. | G05D 23/1917 700/299 |
| 2017/0220445 A1* | 8/2017 | Cunningham ...... | G06F 11/3409 |
| 2018/0032124 A1* | 2/2018 | Fukuoka ............... | G06F 1/3206 |
| 2018/0267924 A1* | 9/2018 | Pagare ................ | G06F 13/4239 |
| 2019/0041951 A1* | 2/2019 | Shapira ................... | G06F 1/324 |

* cited by examiner

*Primary Examiner* — Glenn A. Auve
(74) *Attorney, Agent, or Firm* — Nixon & Vanderhye, P.C.

(57) ABSTRACT

An integrated circuit such as, for example a graphics processing unit (GPU), having an on-chip analog to digital converter (ADC) for use in overcurrent protection of the chip is described, where the overcurrent protection response times are substantially faster than techniques with external ADC. A system-on-chip (SoC) includes the integrated circuit and a multiplexer arranged externally to the chip having the ADC, where the multiplexer provides the ADC with a data stream of sampling information from a plurality of power sources. Methods for overcurrent protection using an on-chip ADC are also described.

21 Claims, 24 Drawing Sheets

VOLTAGE/FREQUENCY SCALING FOR OVERCURRENT PROTECTION WITH ON-CHIP ADC

FIELD

This technology relates to integrated circuit power management, and more particularly to controlling the voltage and/or frequency of signals supplied to integrated circuits on a chip. Still more particularly, this technology relates to dynamically controlling and managing the voltage and/or frequency of clocking signals used to trigger and synchronize digital logic circuits on a chip.

BACKGROUND

Graphics processing units (GPUs) have become ubiquitous. No longer just for graphics, GPUs are now used for a wide range of applications benefitting from intensive computing operations including for example artificial intelligence, real time pattern recognition and autonomous vehicle control, and countless other applications.

Many GPU's are massively parallel—meaning they contain many computing elements operating in parallel at the same time. This allows developers to break down complex computation into smaller parallel pieces that, because they are all being performed concurrently, will complete much faster. While exceedingly fast, such an array of parallel computing elements can consume lots of power. Therefore, power management has become an important aspect of GPU and other integrated circuit design and operation.

Just as a dancer consumes more energy fast dancing than slow dancing, a digital circuit usually consumes more power when it operates faster. In most integrated circuits, operating speed is controlled by a clock circuit. The clock circuit sends out a "beat" (clocking signal) to various circuits on the chip. These circuits synchronize their operation to the "beat." The faster the beat, the faster the circuits operate and the more power they consume.

The kind of transistors (e.g., MOSFETs) used to construct most digital logic circuits operate (switch) faster when power supply voltage is increased. The fastest speed at which the digital circuit can be clocked thus may depend on power supply voltage. Because power is a product of current×voltage, operating circuits at higher voltage cause the circuits to consume more power.

There is thus a tradeoff between speed of operation and power consumption. To increase the number of operations per second, one can increase the rate (frequency) of the clocking signal (and if needed to support the higher clock rate, also the power supply voltage) at the expense of additional power consumption. To conserve power, one can decrease the clocking signal rate (and if desired also the power supply voltage) at the expense of slower processing.

To manage this tradeoff, some GPUs and other processors provide dynamic control over the clock rate (and in some cases also power supply voltage) depending on computation load, allowing the circuits "slow dance" when demands are less and "fast dance" when more computation speed is called for. Such dynamic control can reduce overall power consumption and corresponding heat output.

When too many high power devices (e.g., waffle iron, hair dryer, etc.) are plugged into the same power circuit of your home, a circuit breaker detects the overcurrent and trips. Many power supply designs for GPUs and other integrated circuits use analogous automatic protective circuits to protect against excessive power consumption and resultant overheating. The protective circuits can detect when the chip is drawing too much power and automatically shut down the power until the chip has cooled enough to allow power to be restored again. While the protective circuits protect the chip from destruction, they also temporarily stop the chip from doing its job. This can be a problem when the chip is being relied upon to complete a task.

In more technical detail, some GPUs rely on a technique known as dynamic voltage/frequency scaling (DVFS), to scale voltage and frequency of the core clocks based on the available power budget allocated to the GPU. This technique is often also referred to as "boosting". For example, when the energy consumed by the GPU workload is memory-dominated, the power supply voltage and/or the clock frequency is decreased. Similarly, if the energy consumed by the workload is math- or compute-dominated, the voltage and/or frequency to the core clocks is increased. This approach allows for operations that exploit highest performance within a given power envelope. But this approach also presents a scenario where the GPU can exceed the budgets for power (or current) drawn for short durations. Such exceeding can result in overcurrent situations, which result in board power supplies shutting down. This can occur when the GPU is already in a boosted mode (e.g., operating at a high voltage and frequency) during the processing of a memory-dominated application, when suddenly memory-dominated work is received at the GPU. In such scenarios, the conventional DVFS systems, which are reactive, takes some time (e.g., from 1-10 milliseconds) to respond to the overcurrent. In that duration, there may be a scenario where the power to the GPU exceeds the board thermal power envelope (TGP)(for example, by up to 1.6 times). This overcurrent scenario can cause the board power supply to cut power to the GPU, and thus disconnect the GPU from the system (e.g., cause the GPU to fall off the bus).

Current solutions to the above described problems include building higher capacity power delivery systems to sustain higher current that can mitigate the shutdown. But, building high capacity power supply networks is often too expensive for many applications. Alternate solutions include limiting the boost range, e.g., limiting the highest achievable voltage and frequency, so that the power excesses are curtailed. But limits to boost range come at a cost of losing performance (e.g., due to higher safety margins built-in to the system) for memory-dominated workloads.

Yet another currently used technique is to use platform/analog solutions to droop the supply voltage to the GPU when over current is detected. While this option works well, it has limitations relating to managing the droop precisely and typically also requires building in margins that can compromise effectiveness. Additionally, platform/analog solutions are often too costly to design with off-the-shelf components.

Therefore, further improved solutions that can reliably handle overcurrent situations in chips are still desired.

BRIEF DESCRIPTION OF THE DRAWINGS

The following detailed description of exemplary non-limiting illustrative embodiments is to be read in conjunction with the drawings of which.

DETAILED DESCRIPTION OF PREFERRED EMBODIMENTS

Figure 1A:
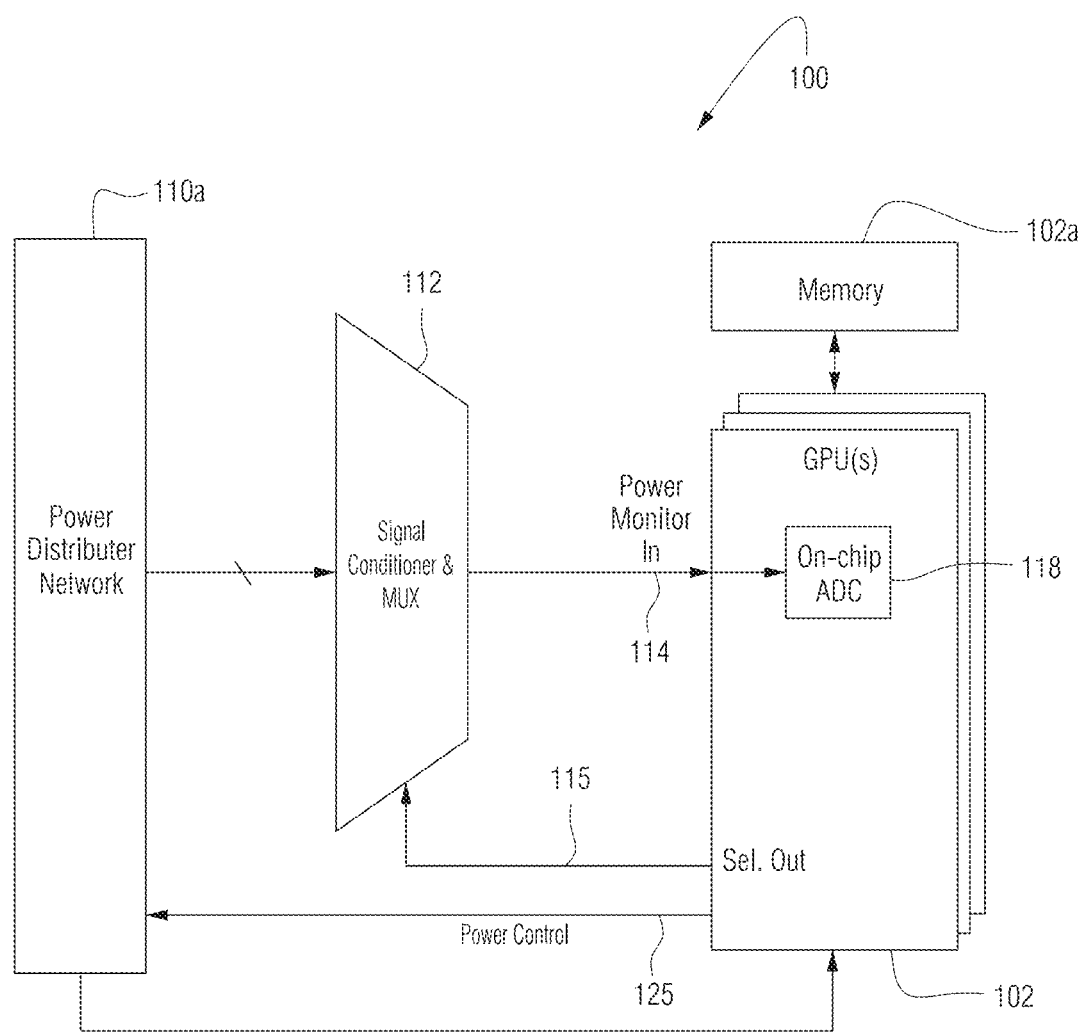
FIG. 1A illustrates an example system for overcurrent control, according to some example embodiments.

Example embodiments bring overcurrent management on to the processor chip such that it functions as an adaptive voltage management system (AVS) that augments the software-managed DVFS to limit overcurrent. Example embodiments can control overcurrent based on the energy-delay product power (sometimes referred to herein as "EDPp") at the voltage regulator (e.g., at the input and/or output of the voltage regulator). Some example embodiments also yield benefits, such as, for example, faster detections of overcurrent occurrences, faster notification of overcurrent detections to software that controls the DVFS to enable improved response times to systematically manage voltage and/or frequency settings to adapt to workload characteristics, facilitating control of various processor functions based on processor power, reducing the number of input/output (I/O) ports dedicated on the processor chip to power control, facilitating finer-grained control of power, and/or reducing cost of overcurrent management on the processor. This disclosure describes several GPU embodiments with on-chip ADC. However, embodiments are not limited to GPU and may include integrated circuits (IC) having included in them other processor types such as, CPU, specialized processors, etc., where the ADC and the other processor and/or a GPU is on the same chip (e.g., same/single wafer block of semiconductor material forming the base of the integrated circuit, same substrate).

Embodiments include a novel GPU arrangement with an on-chip analog to digital converter (ADC)-based overcurrent detector (sometimes also referred to herein as "droopy-on-die"). The novel GPU arrangement provides an overcurrent response time in the 100 us (i.e., 100 microseconds) timescale, e.g., when an overcurrent EDPp event happens, a responsive voltage drop occurs within 10-100 us. At least in some embodiments, a frequency drop (e.g., a reduction in core clock frequency) is achieved for free since clock frequency is tied to voltage with a frequency-lock.

Example embodiments include circuitry performing at least two key aspects of overcurrent control: sensing circuitry to sense overcurrent events, and actuation circuitry for actuating a control in response to sensing of overcurrent. The circuitry includes on-chip circuitry to sense over-current and on-chip circuitry to actuate controlling of the power (more specifically, current and/or voltage) that is input to the chip in response to the detected overcurrent. The circuitry for overcurrent control may, in addition to the on-chip circuitry, also include off-chip circuitry that operates in conjunction with the on-chip overcurrent control circuitry.

Sensing circuitry, in some example embodiments, may include (a) an external ("on-board") analog multiplexer (a multiplexers may be referred to as a "MUX") that provides sensed voltage and current from the board to the GPU chip, (b) on-chip sensing with an ADC that converts channel parameters such as input voltage and current to the chip across all input channels, and (c) a time domain multiplexed (TDM) system that filters the ADC output and converts the channel voltages and currents to power consumed by the chip Actuation circuitry, in some example embodiments, may include (a) circuitry to perform comparison of the current and/or power consumed by the GPU chip against a programmable threshold to generate an error function, (b) a digital control system for minimizing the error function by managing the VID control (reference voltage) to the voltage regulator such that the operating voltage can be modified on the fly (in real-time) to minimize an error function, and (c) a configuration system that can constrain the digital control system to guide setting caps on minimum voltage, managing the slew of the reference voltage to get optimal behavior of reference voltage correction. The digital control system to minimize the error signal may be a programmed input output (PIO) system that can be configured by software and which may run autonomously, or substantially autonomously, in hardware.

When sensing high voltage signals (e.g., 12V) for use with a low voltage device (e.g., ~1-2V), the industry standard is to put the ADC on a separate chip and communicate with it through a digital bus. This is because processor chips, such as, for example, CPU and GPU chips, are designed to handle only relatively low voltages (e.g., 1-2 volts), and thus high voltages exceeding the designed-for voltage range may cause serious damage to such chips. Therefore, currently available GPU overcurrent control systems are based on off-chip ADC. Any filtering of the current supplied to the processor chip in these conventional devices are performed on the external ADC device. Having multiple digital signal processor (DSP) outputs is likely to increase traffic pressure on the bus. Embodiments preprocess the high voltage signal appropriately for an ADC with a low voltage signal. Another advantage of the overcurrent control scheme in the embodiments is that it enables arbitrarily complex DSP to be built around these high speed representations of high voltage signals, and that access is provided to cost-efficient and fast digital logic.

Example embodiments provide several advantages over conventional techniques. As noted above, the conventional technique of enhancing the power delivery systems in order to sustain higher current that can mitigate a shutdown comes at a relatively high cost of building expensive power supply networks. Elements of the overcurrent detection and control actuation in embodiments can be incorporated into the GPU at a fraction of the high cost of higher capacity power supply networks, and is based on fast response times to prevent potential reliability issues. The conventional technique of limiting the boost range, i.e., limiting the highest achievable voltage and frequency, so that the power excursion is curtailed comes at a cost of losing performance for memory dominated workloads. The embodiments are designed to sustain the highest voltage/frequency of operation and still ensure that the desired performance is obtained for memory dominated workloads. The conventional technique of using platform/analog solutions to droop the supply voltage to the GPU when overcurrent is detected may be effective in overcoming disadvantages with the other conventional techniques of beefing-up power delivery networks and of limiting the boost range, but has substantial limitations. For example, the conventional platform/analog solutions to droop are based on discrete analog components with platform level configurability, and typically incurs a high cost penalty.

Example embodiments may also include the following additional advantages: (a) providing a digital solution based on signal conditioning and processing that has a faster response time, (b) providing an on-chip solution with a substantially lower cost burden on platform, which eliminates several platform components, (c) providing a more robust management of droop to control $V_{min}$ (i.e., minimum voltage for operating a processor) such that voltage droops are efficiently controlled, (d) enabling selection between adaptive voltage/frequency scaling (AVFS) and adaptive frequency scaling (AFS) depending on $V_{min}$ constraints, and (e) providing faster response in communicating to the power management unit (PMU) that manages boost.

Currently existing boost mode implementations have a limitation where sudden transition from high energy workloads to low energy workloads (e.g., transition from a compute-intensive workload to a memory-intensive workload) can cause overcurrent situations in input EDPp and cause issues in systems, especially, for example, in systems that use larger numbers of GPU boards (e.g., 4 to 8 or more GPU boards) in a node. This problem is likely to keep intensifying because performance capabilities keep increasing with each generation of systems. Example embodiments may effectively address these system issues in environments, such as, for example, data center environments, server environments, high reliability/high performance environments (e.g., autonomous vehicles), and the like. Example embodiments may resolve this issue effectively with a minimal impact, if any, on performance.

High-Level View of Power Managing Circuit with On-Chip ADC

Figure 1B:
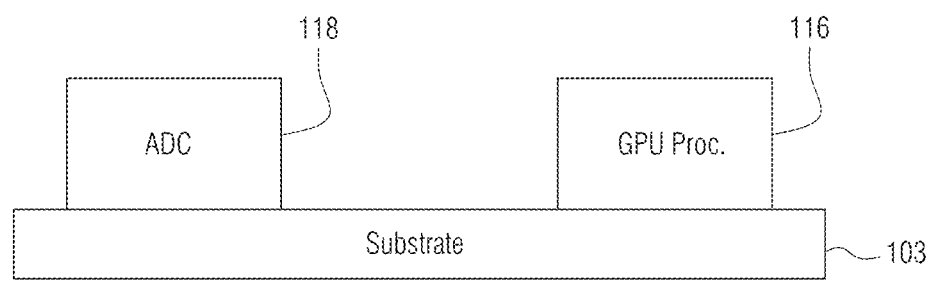
FIG. 1B shows GPU processing circuitry and an analog to digital converter (ADC) in the system of FIG. 1A fabricated on the same semiconductor die or substrate according to some example embodiments.
Figure 1C:
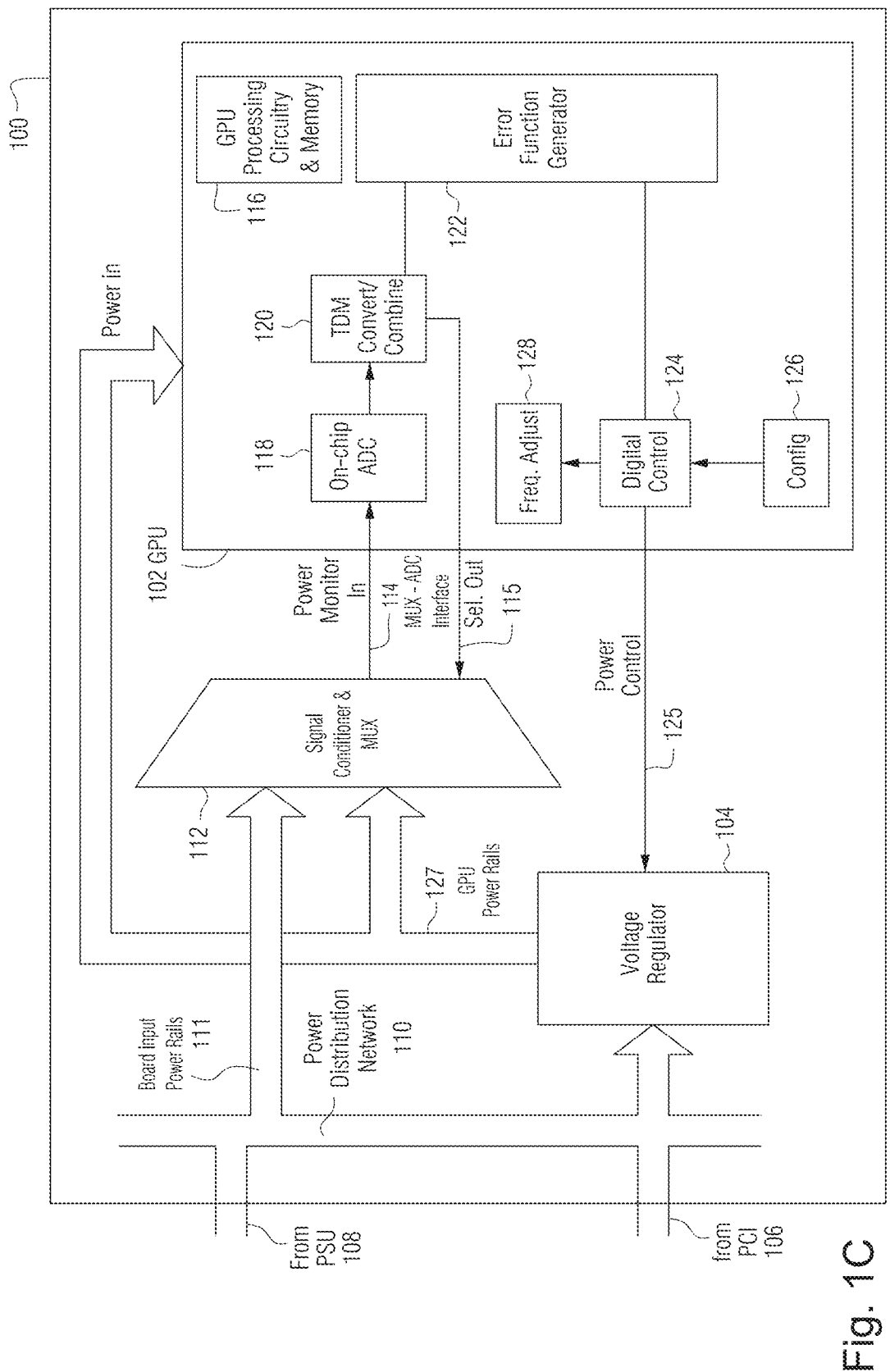
FIG. 1C shows a GPU including on-chip ADC based overcurrent control circuitry and off-chip power distribution components in the system of FIG. 1A, according to certain example embodiments.

FIGS. 1A, 1B and 1C schematically illustrate an example system 100 including the on-chip ADC based overcurrent control according to certain example embodiments.

System 100 may comprise one or more GPUs 102 communicating with one another via one or more PCI or other digital communication bus complex. GPUs 102 may be connected to associated memory 102a. In some embodiments, system 100 may include one or more CPUs or other control processors communicating with the one or more GPUs over the digital communication bus complex, and the control processors and GPUs may access their respective associated memories and/or a unified memory.

The GPU 102 may be any type of GPU such as for example a control processor with a large number of parallel processing units. For example, the GPU 102 may include a processing complex of a large number of stream multiprocessors (SM) configured for highly parallel operation.

FIG. 1A illustrates the system 100 showing GPU 102 being supplied power by a power distribution network 110a, and using an on-chip ADC 118 (as also illustrated in FIG. 1B, GPU 102 and ADC 118 are disposed on the same substrate or die) to monitor a signal 114 of current and/voltage sample information received from an off-chip signal conditioner and multiplexer 112, which samples one or more power rails of the power distribution network 110a. GPU 102 may, via a signal 115, select particular power rails to monitor. Moreover, in response to the monitoring, GPU 102 controls the power received by controlling the power distribution network 110a via a signal 125.

FIG. 1C illustrates system 100 in more detail than FIG. 1A with respect to the power distribution network 110a and GPU 102. GPU 102 circuitry downstream from the ADC 118 operate to control at least one voltage regulator 104 which receives power from PCI or like bus 106 and/or power supply 108 and supplies power to the GPU 102 over power rails 127. The signal conditioner and multiplexer 112 receives GPU power rails 127 and also board input power rails 111.

The power consumed by the GPU can vary based on its current processing workload. For example, when all (or most) of a GPU 102's large number of SMs are busy processing a stream of compute instructions at high supply voltages and clock rates, the GPU may draw a high amount of power from the board and/or through the voltage regulator 104 (shown in FIG. 1C). In contrast, whereas when processing a stream of memory-dominated instructions, it may draw substantially lower amounts of power because, for example, many of its SMs may have idle cycles taking a substantial proportion of time due to the latencies of memory access and in this operating mode the GPU can perform its tasks at lower power supply voltages and clock speeds. In the disclosed embodiments, GPU 102 includes a dynamic voltage/frequency scaling (DVFS), to scale voltage supplied to the GPU and frequency of the GPU's internal core clocks based on the available power budget allocated to the GPU.

In the example shown, as illustrated in FIG. 1C, one or more power supply units (PSUs) 108 supply power to various parts of system 100 directly and also via power rails or connections provided by PCI bus 106. For example, GPU(s) 102 may be powered primarily or exclusively by power a voltage regulator 104 obtains from PSU 108 directly and/or via the PCI bus 106 power rail. Voltage regulator 104 steps the power supply voltage down from PCI bus 106 and/or PSU 108 levels to (programmable) voltage level(s) needed to operate GPUs 102 and supplies the stepped-down voltage(s) to the GPUs 102 via power rails 127. In some embodiments, PSU 108 may alternatively or in addition supply power directly to GPUs 102 via power rails 111.

In the example embodiments shown, circuitry is provided to enable GPU(s) 102 to receive and monitor external power supply voltage and current levels. In particular, an off-chip analog multiplexer (MUX) 112 receives as inputs, levels of power supply voltages and currents used to supply power to GPU 102. Signal conditioning such as voltage divider/scaler circuits and the like in MUX 112 provide signals that are representative of voltage levels and current levels that PSU 108 is supplying either directly or via voltage regulator 104. GPU 102 controls MUX 112 to select particular level signals to supply to a "monitor in" input of the GPU. In response to processing the monitoring signals, GPU 102 generates control signals for programming the voltage output of voltage regulator 104 and may also generate internal control signals that control the clock rate(s) of clocking signals the GPU generates to synchronously operate ("clock") various GPU circuitry.

System 100 may be or include a board (or package) that includes one or more GPUs 102. As shown in FIG. 1A, GPU 102 includes an on-chip analog-to-digital converter (ADC) (equivalently, also referred to as "on-die ADC"—see FIG. 1B) 118 for use in current and/or voltage level sensing. With respect to overcurrent management, the GPU 102, in addition to the ADC 118, also includes other on-chip sensing circuitry (e.g., see circuit 120 in FIG. 1C) and on-chip power management actuating circuitry (e.g., circuits 122 and 124 in FIG. 1C). The on-chip actuation circuitry controls off-chip voltage regulator 104 (shown in FIG. 1C) to program its output voltage in accordance with current GPU power requirements. MUX 112 performs signal conditioning and multiplexing of a plurality of board input power rails 111 from the PSU 108 and the power output 127 from the voltage regulator 104.

The voltage regulator (VR) 104 performs direct current to direct current conversion from a high voltage to a lower voltage. This conversion is necessary in some example embodiments because processing chips such as the GPU 102 are not designed to operate at high voltages such as 12 VDC or 5 VDC, which are typical for the PCI or PCIe bus 106 and/or power supply unit 108 which distribute power on the board power distribution network, but instead operate at lower voltages such as 1 VDC-2 VDC. The voltage regulator 104 is designed also to maintain a regulated DC output voltage to the GPU. The output 127 of the voltage regulator supplies current to the GPU power rails 127 for distribution to the various components of the GPU 102.

Signal conditioning and MUX circuitry 112 samples the plurality of input power rails 127 supplying the GPU 102, and time-division-multiplexes (TDM) the samples to the ADC 118 over the MUX-ADC interface 114, with the selection of which signal to supply to the GPU at a particular time being made by the GPU itself in example non-limiting embodiments. Circuitry 112 also performs signal conditioning to facilitate the signal to the GPU. For example, circuitry 112 may employ voltage dividers or other circuits to scale voltage levels and/or convert current levels to voltage levels representative of the current levels.

The signal conditioning and MUX circuitry 112, by way of multiplexing between the plurality of input power rails 127, enables limiting the number of inputs to the ADC on the GPU to a single input, and thus substantially reduces the I/O pin count of the GPU. The MUX-ADC interface 114 may be highly sensitive to the particulars of MUX 112 and ADC 118. The interface 114 is configured with the MUX and ADC matching each other with respect to impedance, signal range, etc. According to at least some embodiments, the interface 114 provides for a differential signal to be transmitted from the MUX to the ADC. Persons of skill in the art will appreciate that, in conventional systems in which multiple voltage regulator outputs are processed through an ADC located externally to a processor chip, the interface between the voltage regulator outputs and the ADC is simpler, and may not, for example, require complex signal conditioning and/or matching.

As described above, a plurality of input power rails supply 127 power to the GPU 102. Thus, although not specifically illustrated, voltage regulator 104 may include a separate instance for each rail. That is, in some embodiments voltage regulator 104 may include multiple voltage regulators, each of which may be separately and/or independently controlled to set a respective reference voltage etc., for a respective one of the plurality of power rails to the GPU.

The TDM convert/combine circuit 120 monitors the digital samplings of current and/or voltage information as output by the ADC 118, and via an interface 115 controls the MUX 112 to select a particular one of the plural power rails to be sampled for a particular TDM time slot.

The monitored samples etc., are used by the error function generator circuit 122 to monitor the deviation between the actual power being drawn by the GPU (power consumed) and the power level currently expected (power budget) on the GPU. In accordance with the error function determined at circuit 122, digital control circuit 124 signals, via interface 125, to control voltage regulator 104. The target voltage for the voltage regulator 104 can be set via GPIO pins on the GPU. Thus, interface 125 may include control of one or more GPIO pins to the voltage regulator.

Alternatively and/or additionally, the target voltage as determined by the error function generator block may be notified to software, and the software may set a target voltage (after optionally further processing) on the voltage regulator 104. The digital control 124 may utilize configurations 126. In some example embodiments, the software may be the GPU driver software executing on a CPU, and in some other embodiments the software may be different from the driver software (e.g., DVFS control software). The software may also monitor activity levels of the various processing blocks, and adjust the speed of clock(s) to one or more of the processing blocks and/or change a voltage supplied to the GPU. For example, if the activity levels are low, software may operate to reduce one or more clock frequencies and/or one or more supply voltages in order to reduce the amount of power supplied to the GPU; and, if the activity levels are high, the software may increase one or more clock frequencies and/or one or more supply voltages in order to supply more power to the GPU to meet the demands of its increased processing workload.

According to example embodiments, system 100 may be a board comprising one or more GPUs, one or more control processors such as CPUs, and associated memory and/or memory management circuitry. In some example embodiments, GPU 102 may be a system-on-a-chip (SoC) including a GPU. In yet other embodiments, system 100 may, instead of GPU 102, include an integrated circuit with another type of processor and an ADC on the same substrate.

Method for Managing Power Using On-Chip ADC

Figure 2:
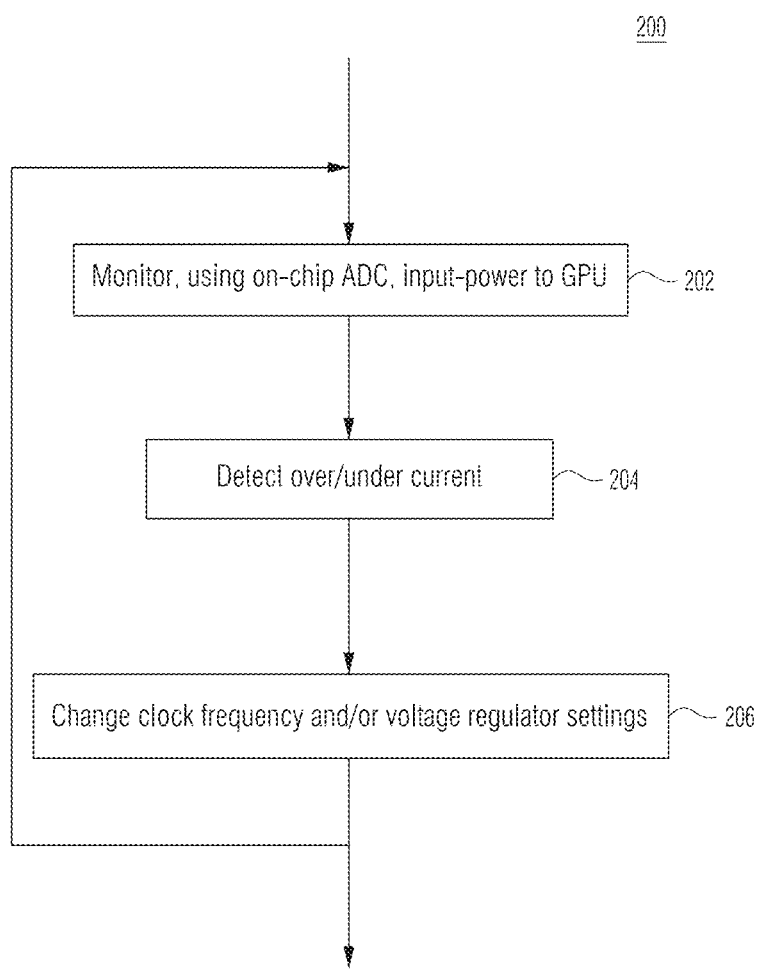
FIG. 2 illustrates a flowchart of a overcurrent control technique using an on-chip ADC according to certain example embodiments.

FIG. 2 illustrates a flowchart of an overcurrent control technique using an on-chip ADC according to certain example embodiments. In some example embodiments, process 200 (operations 202-206) is performed in hardware circuitry components on a GPU, such as, for example, GPU 102. In some other example embodiments, in addition to operations performed on hardware of GPU 102, process 200 may include operations performed by other hardware components of a system, such as, for example, system 100. In yet other example embodiments, process 200 may include, in addition to operations performed by hardware components of the GPU 102 and/or other hardware components of system 100, may include operations performed in software that runs on the system 100 or other part of a system in which the system 100 and/or GPU 102 is operational.

Process 200 may be continuously or continually active during operation of a computer system in which a system, such as system 100, and/or a GPU, such as GPU 102, is being used.

Operation 202 monitors the input power to the GPU. In embodiments, the monitoring of the input power utilizes an on-chip ADC for sampling, such as, for example, ADC 118. The monitoring may include the on-chip ADC sampling input current and/or voltage to the voltage regulator and converting the sampling results to a digital output (e.g., a fixed-width (e.g., 7-bit) digital output).

At operation 204, based upon the digital sample output from the ADC, downstream power management components may compare the measured input current, voltage and/or power with certain predetermined and/or dynamically determined thresholds to decide if an over- or under-current condition is occurring in the GPU. For example, as shown in FIG. 1, based upon digital sampling results output from the on-chip GPU 118, downstream GPU components 120, 122, and 124 operate to determine whether it is necessary to effect changes to the input voltage and/or frequency in a manner responsive to one or more conditions in the GPU. For example, when the GPU workload is compute-dominated, then a determination may be made by any of, or any combination of, components 120, 122, and 124 to increase the amount of power drawn by the GPU 102, and/or when the GPU workload is memory-dominated, then a determination may be made by any of components 120, 122, and 124 to reduce the amount of power drawn by the GPU 102.

At operation 206, based upon the determination made in operation 204, a frequency and/or a voltage may be changed in order to increase or decrease the power drawn by the GPU. For example, if it is determined that a frequency adjustment alone can effect the required change in power, then such a frequency change may be triggered by component 128. In response, in some embodiments, frequency adjust component 128 may adjust the frequency (or rate) one or more clocks. In some embodiments, the voltage may be adjusted in response to the determination at operation 204. A voltage may be adjusted by offsetting the setting voltage sent to voltage regulator to bring the current/power either back under limit, or to increase.

In this manner, process 200 may operate continuously whenever the system 100 is powered on to protect the GPU 102 from damage due to overcurrent while also enabling continuously to control power input to the GPU in accordance with the workload to optimize processing performance and power consumption.

On-Chip ADC Power Managing Embodiments

Figure 3:
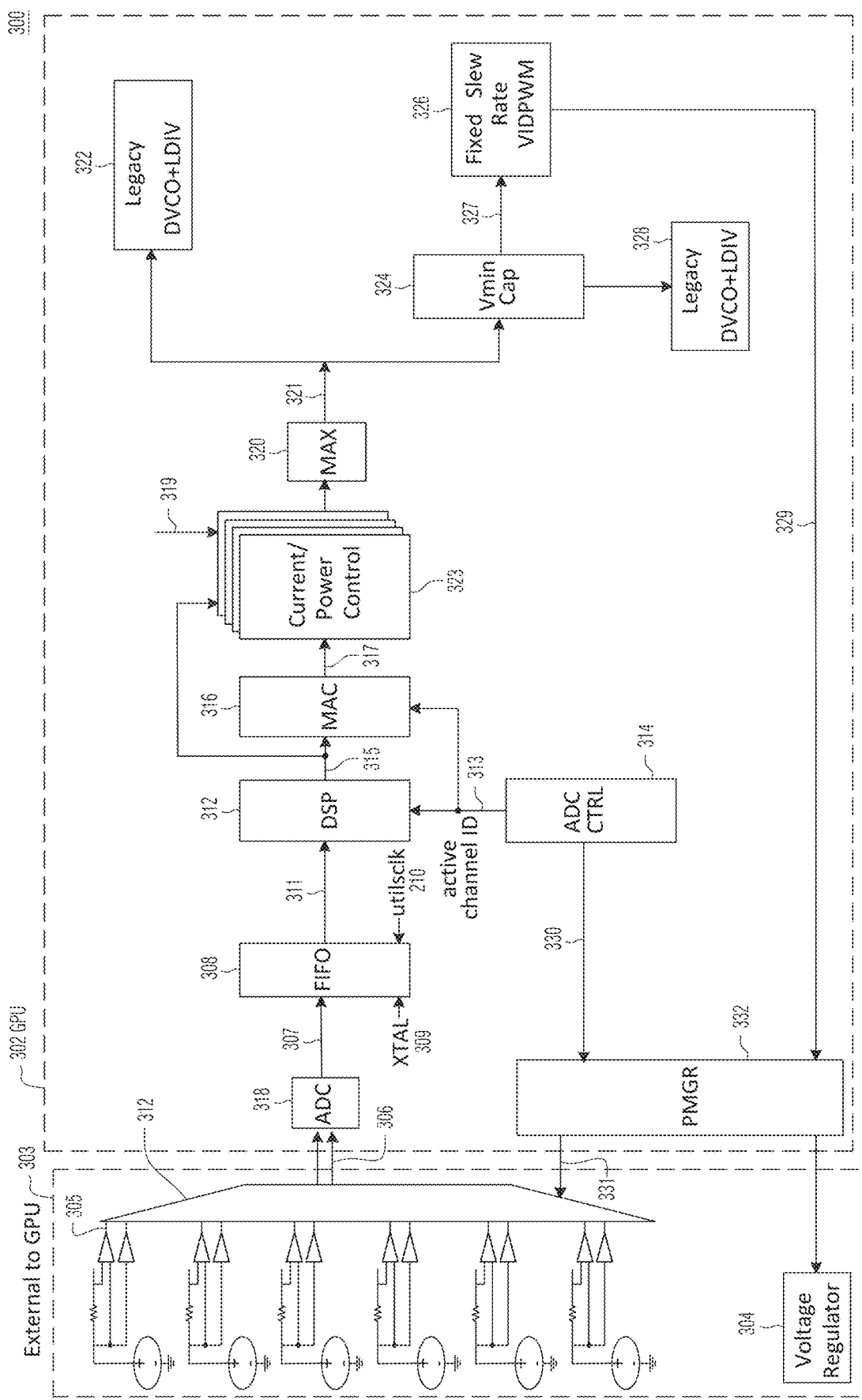
FIG. 3 illustrates a schematic diagram of a circuit providing overcurrent control technique using an on-chip ADC according to certain example embodiments.

FIG. 3 schematically illustrates a circuit 300 implementing an overcurrent control technique using an on-chip ADS, according to certain example embodiments.

The detection of overcurrent in the circuit 300 is performed on-chip on GPU 302. The on-chip ADC 318 is configured to receive differential input from an analog multiplexer 312. Detection of overcurrent by circuitry on-chip in GPU 302 leads to one or more actuation events to control voltage regulator 304. The analog MUX 312 and voltage regulator 304 may be located in one or more components 303 that are external to the GPU 302. According to some embodiments, circuit 300 may be included in a system, like system 100, with GPU 302 corresponding to GPU 102, MUX 312 corresponding to MUX 112, and voltage regulator 304 corresponding to voltage regulator 104.

The analog MUX 312 may receive a plurality of power inputs 305. Each power input 305 (also referred to as a power channel or power rail) may provide the same or respectively different voltages and currents. The MUX 312 outputs a TDM stream 306 of voltage and current, acquired by sampling respective power input 305, to ADC 318. The MUX 312, in a manner similar to that described in relation to MUX 112 above, may perform signal conditioning based on the input power etc. so that the interface 306 between the MUX 312 and the ADC 318 can be reliably operated. The output 306 from the MUX 312 may be provided as a two-wire differential input to the ADC 318. The particular channel, from plural channels 305, to be output in a particular TDM slot (or group of slots) may be selectable by a GPIO input 331 specified by ADC controller 314 and/or GPIO manager 332. According to example embodiments, the operation of MUX 312 may be identical or similar to that described in relation to signal conditioning and MUX 112 in FIG. 1.

The ADC 318 may be based on a frequency-locked loop (e.g., NAFLL) and with differential inputs 306. In some example embodiments, the ADC may be running on a first clock domain (e.g., XTAL clock domain) 309 which is asynchronous to a second clock domain (e.g., utilsclock domain used by downstream circuitry) 310. An asynchronous FIFO 308 may operate between the ADC 318 and the next processing component in order to address issues associated with clock domain crossing. The FIFO 308 may receive raw ADC output 307 and output the same as raw ADC output 311 after buffering to synchronize between the first and second clock domains. The FIFO 308 is an asynchronous FIFO unit for clock domain cross as the ADC output and the downstream EDP control digital logic run on different clock domains.

An ADC control circuitry 314 operates, by signaling 330 to the GPIO manager 332, to drive a 1-bit MUX select GPIO output 331 to select which one of the ADC channels is to be monitored by the DSP 312 in a particular TDM timeslot (e.g., 1-bit ADC MUX selection signal to specify which one of the 12 channels is being selected for measurement). The ADC control component 314 also provides DSP 312/MAC 316 with the identifier of the selected active ADC channel 313 (e.g., active channel ID) to be processed by DSP 312/MAC 316. Thus, ADC control 314 also controls the DSP and MAC to process the raw data sampled from the current active channel. The ADC control 314 may also reset the ADC logic if requested by software.

The ADC control circuitry 314 also outputs a 1-bit ADC MUX selection signal 330 to PMGR 332, which is the unit that manages all GPIO, to specify which one of the channels (e.g., which of the shown 12 input channels in FIG. 3) is/are being selected for measurement. PMGR 332 outputs a signal 331 which is a 1-bit ADC MUX selection signal from a GPIO pad to the on-board MUX 312. An active channel ID selection signal 313 from the control state machine is provided to the on-chip circuitry downstream from the ADC due to the TDM design shared by all current/voltage channels.

The digital signal processor (DSP) 312 and multiplier-accumulator (MAC) 316 circuits include IIR filters, multipliers and accumulators to process the raw ADC output 311. DSP 312 may include filters such as software programmable IIR filters. DSP 312 may apply the filters to remove certain noise elements that may, for example, have been introduced in the signal conditioning and multiplexing at the external MUX 312. DSP 312 output 315 (e.g., V/I pairs (6 pairs=x 12)) is transmitted to MAC 316 and to current/power limiting circuitry 323. MAC 316 may multiply current and voltage to compute power (e.g., P=V*I), and may accumulate current, voltage and/or computed power over a configurable time window on a per channel basis. The filtered input current/voltage 315 may be fed into a direct path to current/power limiter 323 so that the EDPp management can be done based on the current, voltage and/or power.

The MAC circuitry 316, in addition to multiplying input current and voltage pairs to get a number for power, also accumulates current, voltage and/or power over time (e.g., configurable time windows) so that software can get an averaged current, voltage and/or power at any arbitrary interval, for example, to use in DVFS. The accumulated statistics may be polled by software to obtain average statistics for current, voltage and/or power. MAC 316 provides its output 317 (e.g., computed power for each of the input channels) to the current/power limiting circuitry 323.

The current/power limiting circuitry 323 operates to compute the voltage offset (positive or negative offset) to be applied based on the selected ADC channel sample results, calculated power and, optionally, a software programmable block activity input 319, to bring the consumed power on the GPU 302 back below a particular limit. The particular limit may be predetermined either manually (e.g., BIOS configuration) or dynamically based on estimated workload, operational mode selections etc.

The current/power limiting circuitry 323 can also, in addition to taking computed power numbers from MAC 316 and current/voltage numbers (e.g., from DSP 312 or MAC 316) as inputs, take block activity as input 319. Block activity, in some example embodiments, is GPU based on-chip power sensors which estimate power by collecting toggle counts etc. of various signals of graphic and memory units. The capability to determine overcurrent events based on the current, voltage, calculated power, and also a programmable selection of block activity (e.g., programmable selection of GPU processing circuitry/blocks power consumption, provide embodiments with the capability to protect the voltage regulator input as well as output.

Current/power limiter circuitry 323 may be implemented as multiple instances, with each instance selecting from any one of the channel current/voltages (e.g., 12 C/V channels), channel pair power results (e.g., 6 computed power results), and block activity input (e.g., block activity from 3 sensors), then compare with software programmed threshold(s) and compute the amount of offset to be applied to bring current/power back under a predetermined limit In some embodiments, circuitry 323 may initiate modulation of the core voltage, and/or, among other things, a PID controller. In effect, circuitry 323 many embodiments may be configured to effect some linear control of the current and/or voltage input to the GPU.

The output from the current/power limiting circuitry 323 is provided to a maximum determining circuit 320. Circuit 320 in turn, selects maximum offsets from among the offsets for respective channels, and transmits selected ones of the current/power limiting circuitry 323 outputs, as offsets 321 (e.g., HI_OFFSET), to the response actuation mechanisms in circuitry 322 and 324. For example, in some embodiments, circuit 320 may receive the determined offsets from each of multiple instances of current/power limiting circuitry 323, and may determine the maximum offset(s) among the multiple instances of current/power limiting circuitry 323. The maximum offsets may be determined based on individual samplings, and/or by accumulating per-channel offsets over a configured time window in which to determine a maximum.

The example embodiments may support one or both of two different response mechanisms for the on-chip ADC based power management feature. The response mechanisms include a voltage scaling (e.g., circuitry 326) and a frequency scaling (e.g., circuitry 322 and 328) to control power to the GPU.

In the frequency-only scaling circuitry 322, hardware may be configured to engage clock slowdown whenever it detects the maximum voltage offset value 321 being greater than a predetermined value (e.g., greater than 0). Circuitry 322 may engage known frequency slowdown mechanisms which are used in currently existing GPUs, such as, for example, DVCO+LDIV (digital voltage controlled oscillator+word length divider) frequency only scaling, without attempting to engage voltage control. This provides for responding by dropping frequency only (without accompanying voltage change) on an EDPp event.

The minimum voltage capping circuitry 324 determines whether the maximum voltage offset 321 is higher or lower than the minimal voltage required by the GPU to run functionally correctly. The minimum voltage may be software configurable. Hardware is prevented from lowering the voltage below the configured minimum voltage. The minimum voltage capping circuitry 324 ensures that the final target voltage requested by GPU is greater than or equal to the configured minimum voltage. The minimum voltage capping circuit 324 enforces a minimum voltage, by, for example, engaging circuit 326 to control the voltage so as not to go below the configured minimum voltage and, thereafter (i.e., if further reduction of consumer power is required), engaging circuit 324 to control the frequency for further lowering the power Based on the determination at circuit 324, fixed slew rate PWM voltage adjust circuitry 326 takes the post offset target voltage setting 327 (capped at circuitry 324) from upstream logic and drives an output PWM signal 329 to the external voltage regulator 304 to change the voltage at a fixed slew rate. In respective embodiments, the voltage scaling may target only a reference power rail (e.g., the VDD rail), or any group of one or more of the power rails. The output 329 (e.g., NVDD_L VID PWM) from circuit 326 is provided to GPIO manager 332.

Alternatively and/or additionally, based on the determination at circuit 324, if the voltage adjustment required for satisfying the offset power requirements reaches the configured minimum voltage, then at circuit 328, hardware may engage additional clock frequency slowdown to bring the consumed power back under the limit while not adjusting the voltage below the configured minimum voltage. When input side EDPp violation occurs at Vmin as determined by circuit 324, frequency scaling may be engaged at circuit 328. For example, engaging a 1.5×LDIV clock (e.g., core clock) frequency slowdown may further reduce current draw of GPU. This clock frequency adjustment may be separate and independent of the frequency-only scaling mode in circuit 322. Frequency-only mechanism in circuits 322 and 324 may be independently enabled/disabled and programmed to different slowdown/speedup factors.

GPIO manager 332 may control the voltage regulator 304 based on the input 329 from circuit 326. The GPIO manager 332, as noted above, may be configured to manage all GPIO in GPU. All output signals may be routed through GPIO manager 332 to a GPIO pad and signals 333 in accordance with 329.

Cross Clock Domain Data

Figure 4:
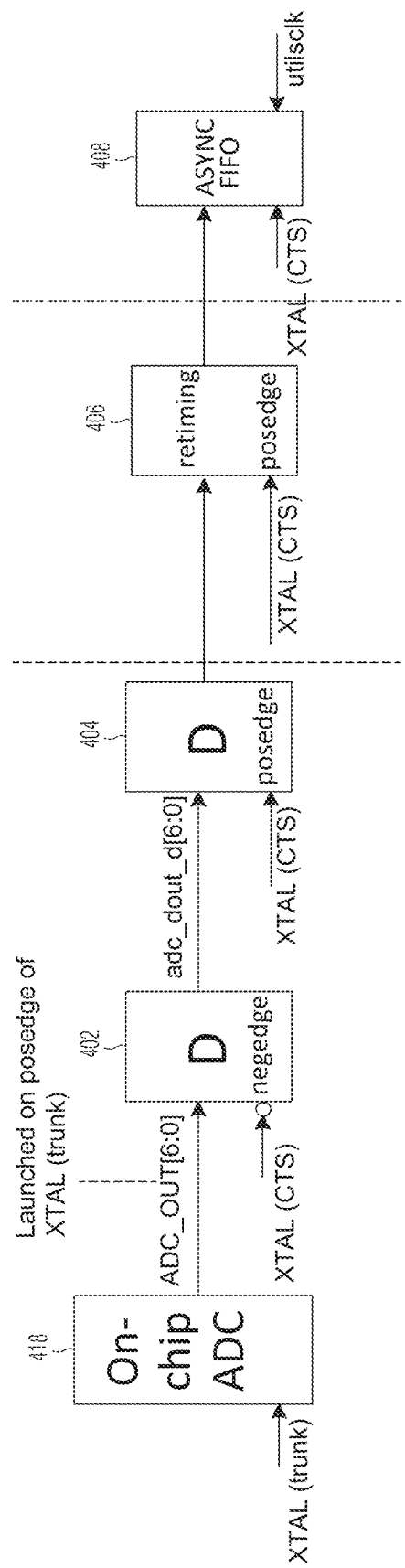
FIG. 4 is a schematic diagram showing the on-chip ADC and circuit components in the path of data output by the ADC in the circuit of FIG. 3, according to certain example embodiments.

FIG. 4 schematically illustrates circuitry to synchronize the output of the on-chip ADC with downstream circuit components, according to certain example embodiments. Having the ADC on-chip, embodiments require that the output of the ADC, which operates at a clock rate selected for operation with the external MUX (such as MUX 312), can be used by the circuitry downstream on the chip from the ADC.

The operation of on-chip ADC 418 may be identical or similar to on-chip ADC 118 and/or 318 described in relation to FIGS. 1 and 3. Having the ADC on-chip makes it necessary to reconcile different clock domains. As described above, on-chip ADC 418 samples input current/voltage to the voltage regulator and convert the results to a digital output which then gets used in downstream EDPp management circuitry.

In example embodiments, the output of the on-chip ADC will be on a first clock domain which is different than a second clock domain on which the downstream power management circuitry operates. An asynchronous FIFO 408 is used to enable the circuitry on the second clock domain to access and use data output by the ADC operating on the first clock domain. For example, the output of the ADC 418 may be on XTAL (trunk) and it may cross XTAL (CTS), in digital sampling circuitry 402 and 404 (modules 402 and 404 represent the negative and positive edge flop runs on the XTAL clock, respectively), and utilsclk domains before it can be used by the DSP/MAC circuits on utilsclk clock domain. In example embodiments, the ADC/trunk/CTS transfer is maintained within a single partition (in circuits 418, 402 and 404) and is retimed and reset with standard positive edge retiming flops in retiming circuit 406. Circuit 406 inserts retiming flops the long distance ADC wires to meet timing. The output of the retiming circuit is fed to the asynchronous FIFO 408. As noted above, the asynchronous FIFO unit 408 enables clock domain crossing as the ADC output and the downstream EDPp management digital logic run on different clock domains.

ADC Control

Figure 5:
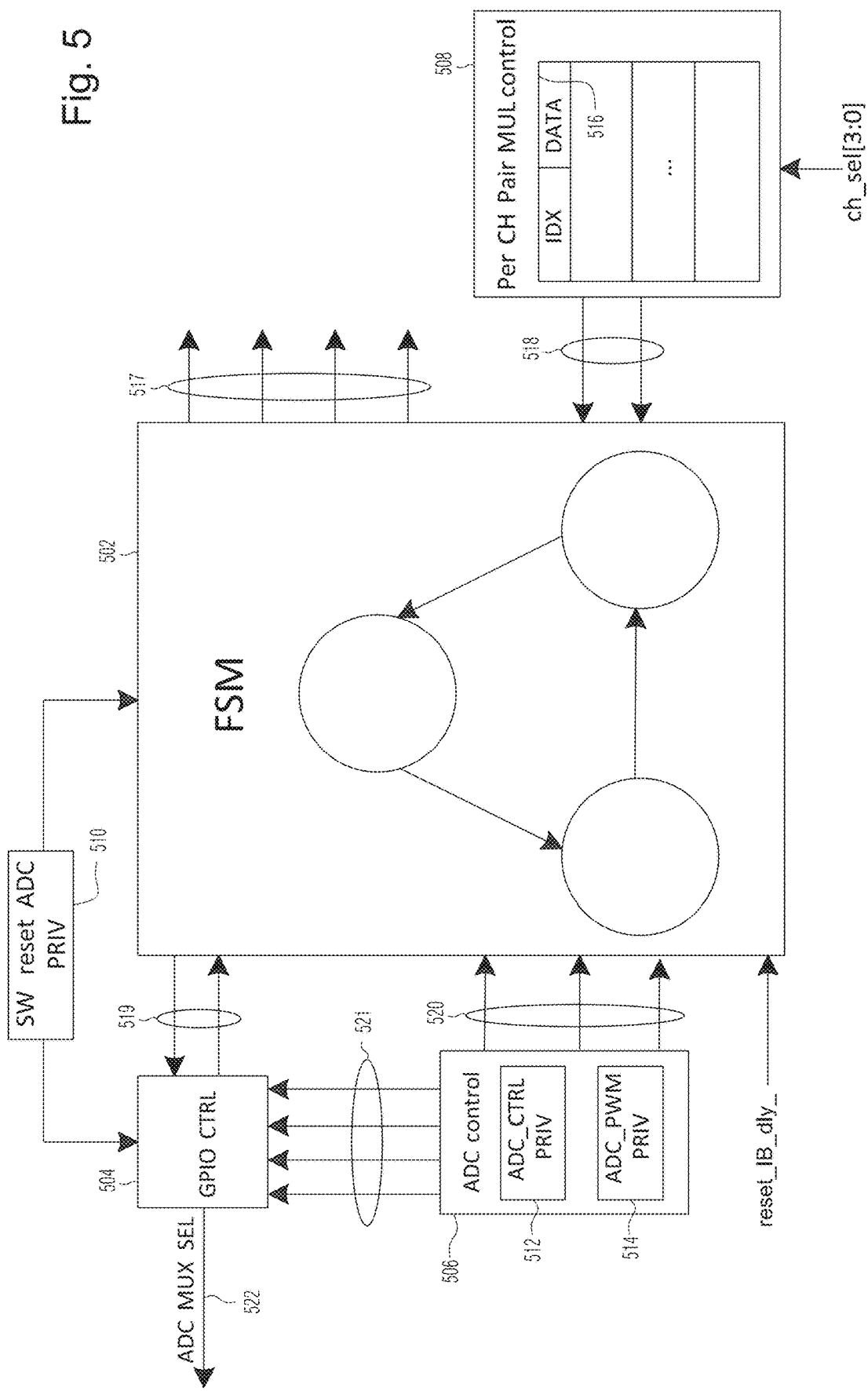
FIG. 5 is a schematic diagram showing the ADC control component in the circuit of FIG. 3, according to certain example embodiments.

FIG. 5 is a schematic diagram of the ADC control unit, such as, for example, ADC control circuit 314 in FIG. 3, according to certain example embodiments.

As described in relation to ADC control 314, the ADC control unit has at least three major functions: driving an ADC MUX selection output 522 (which corresponds, for example, to MUX selection signals 330/331 shown in FIG. 3) to select one of the plurality of power channels being multiplexed to be measured (e.g., one of the 12 channels is being measured); controlling the DSP/MAC circuitry to process raw ADC data in a time sliced manner, using, for example, channel select and other signals 517 (e.g., channel select, op1_channel, op2_channel, and multiplex_enable signals); and resetting the ADC per software request (e.g., software reset register 510 is written by software to trigger reset of the ADC).

The ADC MUX selection output 522 is the channel selection signal which gets connected to the on-board MUX (e.g., MUX 112, MUX 312) outside the GPU. Output 522, in this embodiment, is a 1-bit ADC MUX selection signal to specify which one of the plural channels (e.g., 12 channels) being multiplexed is being selected for measurement. The signal 522 is driven by the GPIO control circuitry 504. GPIO control 504 drives the signal 522 based on the timing settings (e.g., which may be programmed by software) to cycle through each individual channel Software is responsible for doing one time configuration during boot time to ADC control registers 512 and 514 (ADC_CTRL 512 and ADC PWM control 514).

ADC control circuitry 506, using registers 512 and 514, conveys (to GPIO control 504) signals 521, which selects the active channel and specifies certain software defined parameters (e.g., active channel, PWM periods, PWM offsets etc. signals) for driving the output MUX selection signal. ADC control 506 includes software parameters for enable/disable of ADC feature, IIR filter length and initial wait time before DSP takes the first sample (e.g., to synchronize between the MUX selection signal 522 and the DSP actually capturing the channel selected by signal 522). ADC control register 512 may be used to enable/disable the ADC feature. It may also be used to specify the IIR filter length used in DSP. Register 514 may define the PWM period and PWM_HI that ADC controller uses to drive the 1-bit GPIO output to the on-board MUX to select the active channel id. In an example embodiment, the maximum period of PWM is set at $2^{12}/108$ MHz=37.9 us. PWM_HI defines the positive portion of PWM. ADC control 506 also provides the finite state machine 502 with signals 520 which are ADC feature enable/disable selections controlled based on software programmable registers indicating ADC time offset, ADC sampling delay etc. Finite state machine 502 informs the downstream circuitry (e.g., DSP/MAC units 312/316) the current active channel.

The FSM 502 is also provided with input 518 (e.g., multiplexer op1 and op2 signals) from a per channel pair multiplex control 508 which operates on channel information 516. Per channel pair multiplex control 508 defines which channel to be feed into MAC unit to compute power. As illustrated, signals 518 provide the ID of the channels selected as operand 1 and operand 2 to compute power. The index/data pair register 516 compresses the register space required to store the per channel pair power results. To read each individual power result, software may program the index first to point to the desired channel pair then read the corresponding data register to get the power number.

Signals 519 are used by the FSM 502 to notify GPIO control 504 to switch to the next channel and GPIO control 504 to notify FSM 502 that the current sampling cycle is done. Signals 517 include the FSM 502 providing to the MAC (e.g., MAC 316) the operands to be used in the MAC to compute power based on the latest sampled current and voltage, and the FSM 502 providing to DSP (e.g., DSP 312) the current active channel ID.

Timing Relationship in On-Chip ADC Circuits

Figure 6:
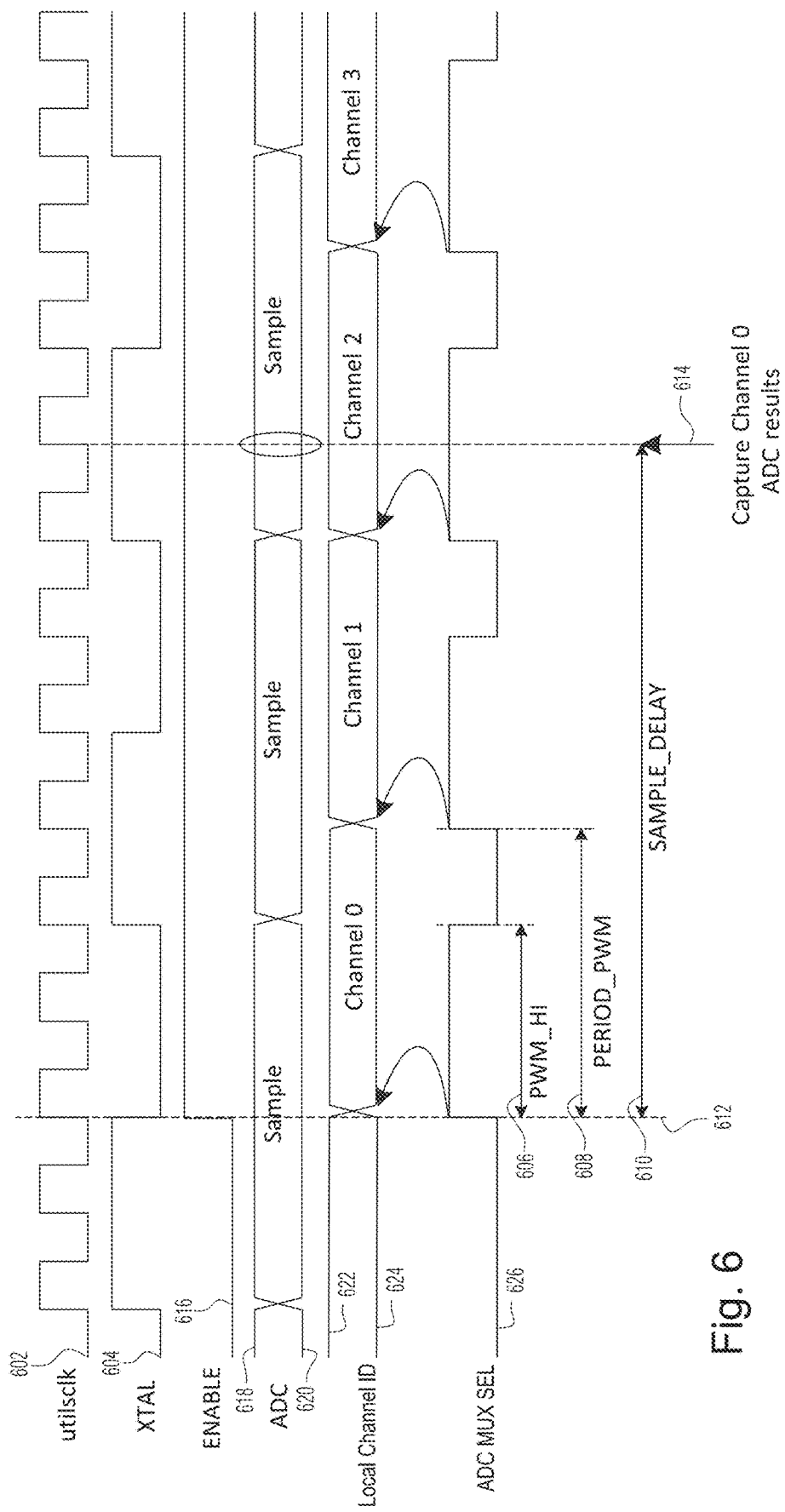
FIG. 6 is a timing diagram showing several key timing parameters in the circuit of FIG. 3, according to certain example embodiments.

FIG. 6 is a timing diagram showing several key timing parameters and their relationship to each other, according to certain example embodiments. Specifically, FIG. 6 illustrates the timing relationships between the different clock domains, the ADC sampling, active channel ID selection signal and the ADC MUX selection signal by the ADC control (e.g., such as ADC control 314).

The ADC runs at XTAL clock 604 (e.g., a crystal clock used by the ADC output) and ADC control runs at utilsclk clock 602 (e.g., clock used by EDP control digital logic). Signal 616 is the software-controlled enabling of the ADC feature.

The timing diagram also shows key parameters PWM_HI 606, PERIOD_PWM 608, and SAMPLE_DELAY 610. PWM_HI 606 defines the positive portion of the pulse width modulation signal according to which the ADC MUX selection signal 522 from GPIO control 504 is driven at. PERIOD_PWM 608 defines the period of the pulse width modulation signal that drives the ADC MUX selection signal 522. SAMPLE_DELAY 610 defines how long the controller (e.g., ADC controller 314) waits for before sample capture takes place. This delay accounts for both the raw sampling latency of the ADC as well as multiplexer transition time of the external on-board MUX. According to some configurations, SAMPLE_DELAY>PERIOD_PWM such that the sampling associated with a channel takes place while the controller is sending the PWM code for a subsequent channel. For example, in the illustrated timing scenario, while the SAMPLE_DELAY starts at time 612, at which time the MUX select signal selects channel 0, the capture of channel 0 ADC results occurs at time 614. PWM-HI, PERIOD_PWM and SAMPLE_DELAY can be maintained in configured registers.

The timing diagram also illustrates the ADC enable signal 616, ADC sampling signals 618 and 620 (e.g., 7-bit digital output from the on-chip ADC macro for the current/voltage value), local channel ID signals 622 and 624 which indicate the current active channel that is being sampled by ADC, and the ADC MUX selection signal 626 (e.g., 1-bit ADC MUX selection signal to specify which one of the plural channels is being selected for measurement).

DSP/MAC Circuitry

Figure 7:
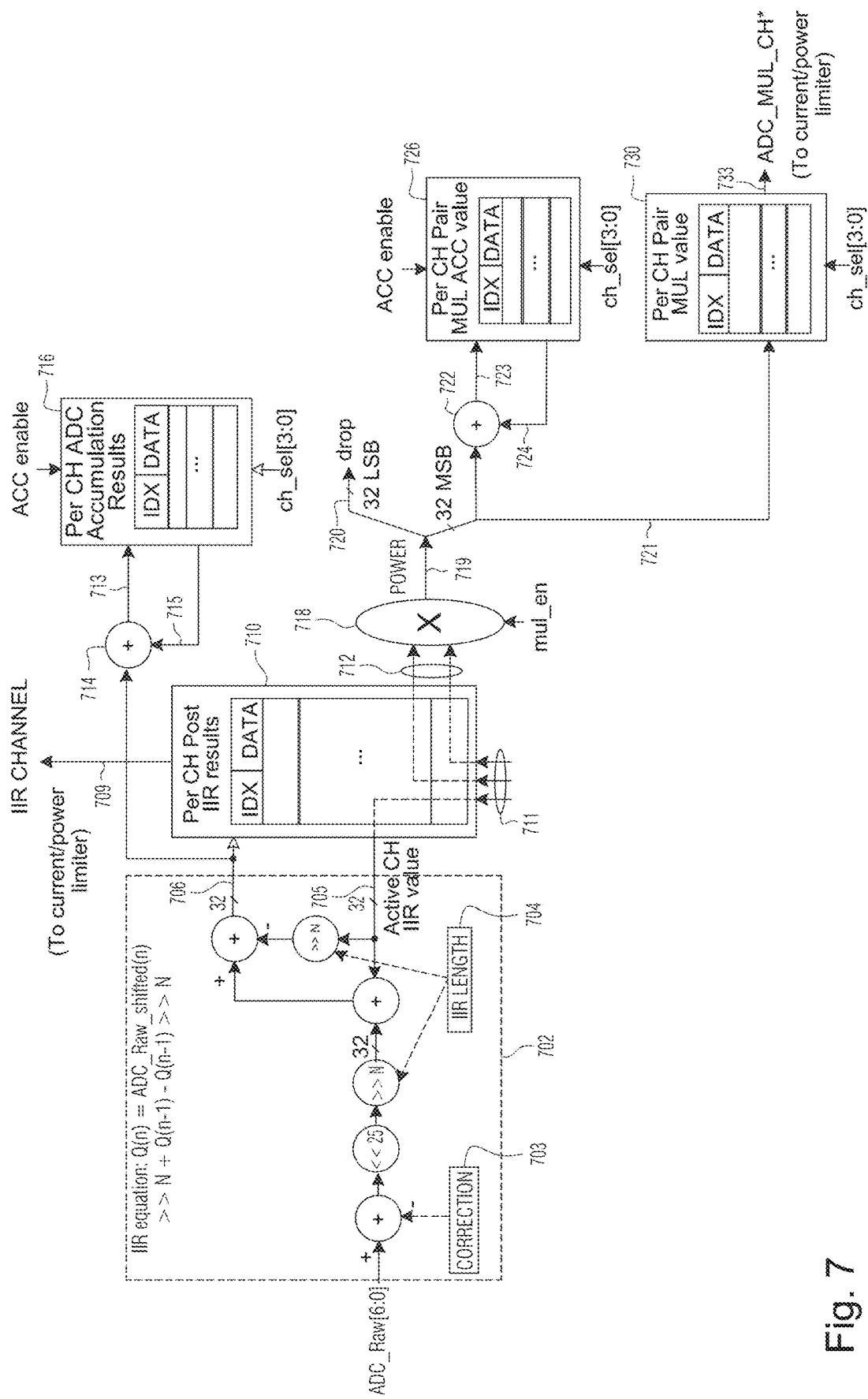
FIG. 7 is a schematic diagram of a digital signal processor (DSP)/multiplier and accumulator (MAC) unit in the circuit of FIG. 3, according to certain example embodiments.

FIG. 7 is a schematic diagram of the DSP and MAC units, such as, for example, DSP circuitry 312 and MAC circuitry 316, according to certain example embodiments.

In some embodiments, more than one instance each of the DSP and MAC may be implemented, and each DSP/MAC may be assigned any number of the channels being monitored. Thus, two or more channels may be processed simultaneously by DSP/MAC circuits. To save power and chip area for this feature, some example embodiments may instance one DSP/MAC circuit which is shared by all (e.g., 12) channels during operation, such that, at any given time, only one channel may be active. The ADC control (e.g., ADC control 314) tracks the ID of the current active channel. The DSP/MAC circuits use this channel ID to update the corresponding product and accumulation results.

The DSP and/or MAC circuit may cause the reset of the ADC upon detection of certain predetermined conditions. According to an embodiment, when a reset request is received from software (written to a software settable register to trigger ADC reset), the ADC control circuit may hold the same ADC MUX select signal for at least a predetermined time to trigger reset of the ADC. This will cause a reset of MUX to a default known channel. It may be configured that, the reset register bit is written by software, but can only be cleared by hardware after the whole reset sequence has finished. If software keeps the enable bit of ADC sensing feature being on when issuing the reset, then hardware will automatically start the next ADC sampling period right after the reset sequence is done. This is an atomic behavior which doesn't require extra software intervention.

This resetting mechanism might be used in certain scenarios such as when software and/or hardware detects error on the collected ADC data. For example, channel loss could cause misalignment of current/voltage data captured at ADC output. This could be detected by either software or hardware mechanism. Once we detect such kind of error, software should trigger a reset to ADC sensing logic. In some embodiments, this function may be performed by hardware error detection logic. Also, during power on or after exiting from some low power state like GC6, software might want to issue an ADC reset to start from a known state.

The DSP and MAC circuitry process the raw ADC output data. Three major functions may be performed by the DSP/MAC circuits: filtering noise; computing power based on current and voltage; and accumulation of power and other parameters over time intervals. The filtering (e.g., using an IIR filter) is performed once every sample at the same periodicity as each channel Multipliers take two filtered channels and multiply their result into an integer (e.g., int64) value. This result also feeds an accumulator.

The DSP/MAC circuitry may expose the following ADC results to enable reading by software: per channel post filter current and voltage (×12 channels); per channel post filter current and voltage accumulation (×12 channels); per channel pair power (×6 channel pairs); and/or per channel pair multiplier accumulation (×6 channel pairs). These results may be stored in index based registers which can be accessed using the index/data pairing. Note that post filter accumulation and multiplied result (e.g., power) accumulation results may not be required for EDPp protection hardware to operate. The non-accumulation results will be updated at a fast (e.g., about 2.4 us) interval, which is substantially faster than what software can handle.

As shown in FIG. 7, a filter circuit 702 filters out the noise of sampled raw ADC output results. The filtering may, at least some embodiments, use an IIR filter. The filter may first left shifts the raw ADC (e.g., by 25 bits) to make use of all (e.g., 32 bits) available bits during the operation in order to mitigate the precision loss caused by raw data filtering. Because of the way the external MUX is connected to the on-chip ADC in some embodiments, the true dynamic range may be expected to be in the range from 0b1000000 to 0b1111111, where 0b1000000 corresponds to the 0 mV/mA. Although such noise correction is adequate for accumulating voltage and current (mV/mA), other techniques may be required for accumulating power because power=voltage*current cannot be isolated from the expanded product of (voltage+offset)*(current+offset). Therefore, in order to correct for that, a programmable subtraction may be provided right after the ADC sampling. A register 703 may be programmed by software with a correction to be applied to the raw ADC output that is input to the filter circuit.

The filter window (e.g., IIR window length) size 704 may be set for filtering out noise in ADC output of sampled voltage (e.g. VDD voltage). Signal 706, which is output from the filter block 702, includes post filter ADC result for current ADC sampling cycles to be saved into the per channel post IIR results array. Signal 706 is obtained by further adjusting the noise-filtered and corrected ADC output in accordance with another signal 705. Signal 705 includes archived post filter ADC result from previous ADC sampling cycle. This corresponds to the $Q(n-1)$ in equation $Q(n)=ADC\_Raw\_Shifted(n)>>N+Q(n-1)-Q(n-1)>>N$.

Signal 706 includes post-filter ADC output, and includes current and voltage values corresponding to respectively sampled channels. These filtered current and voltage values from signal 706 may be stored in a register array and/or memory by post-filter result storing block 710. Post-filter result storing block 710 keeps track of the current and voltage values from the sampled channels. Signals 711, which are input to block 710, include the ID of the current active channel that the filter block 702 is processing and which of the two of the channels are being read out to be multiplied to get the power number. Signal 709, which is provided from block 706, includes instantaneous post filter ADC results for all channels and each of them could be independently selected to be compared against software programmed EDPp threshold to decide the amount of voltage/frequency offset that is to be applied to bring power/current back under limit.

Signal 706 may also be provided to an accumulation circuit 716 to be accumulated in a register array and/or memory. Circuit 716 stores the per channel ADC accumulation results in the form of index/data pairs. The storage format can be used to access each individual channel ADC accumulation result. To access a specific channel, software can program the index to the index register and then it can read the accumulation result for that channel from the data register. The signal 713 that is provided to circuit 716 for storing accumulations is obtained by combining signals 706 and 715.

Signal 715 provides the archived accumulated per channel ADC result upto the last ADC sampling cycle. At 714, the post-filter ADC result 706 for the current ADC sampling cycle is added to the archived accumulated per channel ADC result 715 till last ADC sampling cycle before writing it back to the accumulation results array. Signal 713 provides the accumulated per channel ADC result including the result from the current ADC sampling cycle which needs to be written back to the accumulation results array.

Signals 712, output from block 710, are operand 1 and operand 2 to be used for power calculation. Multiplier 718 computes power=current*voltage=operand 1*operand 2, and outputs power 719. The power, or more specifically the 32 most significant bits of the power number, are used and stored in the downstream logic. Signal 721 stores the 32 MSB bits from the product of 32-bit current and 32-bit voltage to per channel pair power results array. At 722, the power result for each ADC channel pair is added to the archived accumulated per channel pair power result, and signal 723: provides the accumulated per channel pair power result including the power from the current ADC sampling cycle. As shown at 720, the 32 least significant bits of the power number are dropped.

Register array and/or memory 726 stores the power accumulation results per channel pair. Index/data register pairs in 726 can be used to access each channel pair power accumulation results. To access a specific channel pair, software may program the index to an index register and then it can read the power for that channel pair from data register. Signal 724 provides the archived accumulated per channel pair power result up to the last ADC sampling cycle.

Figure 8:
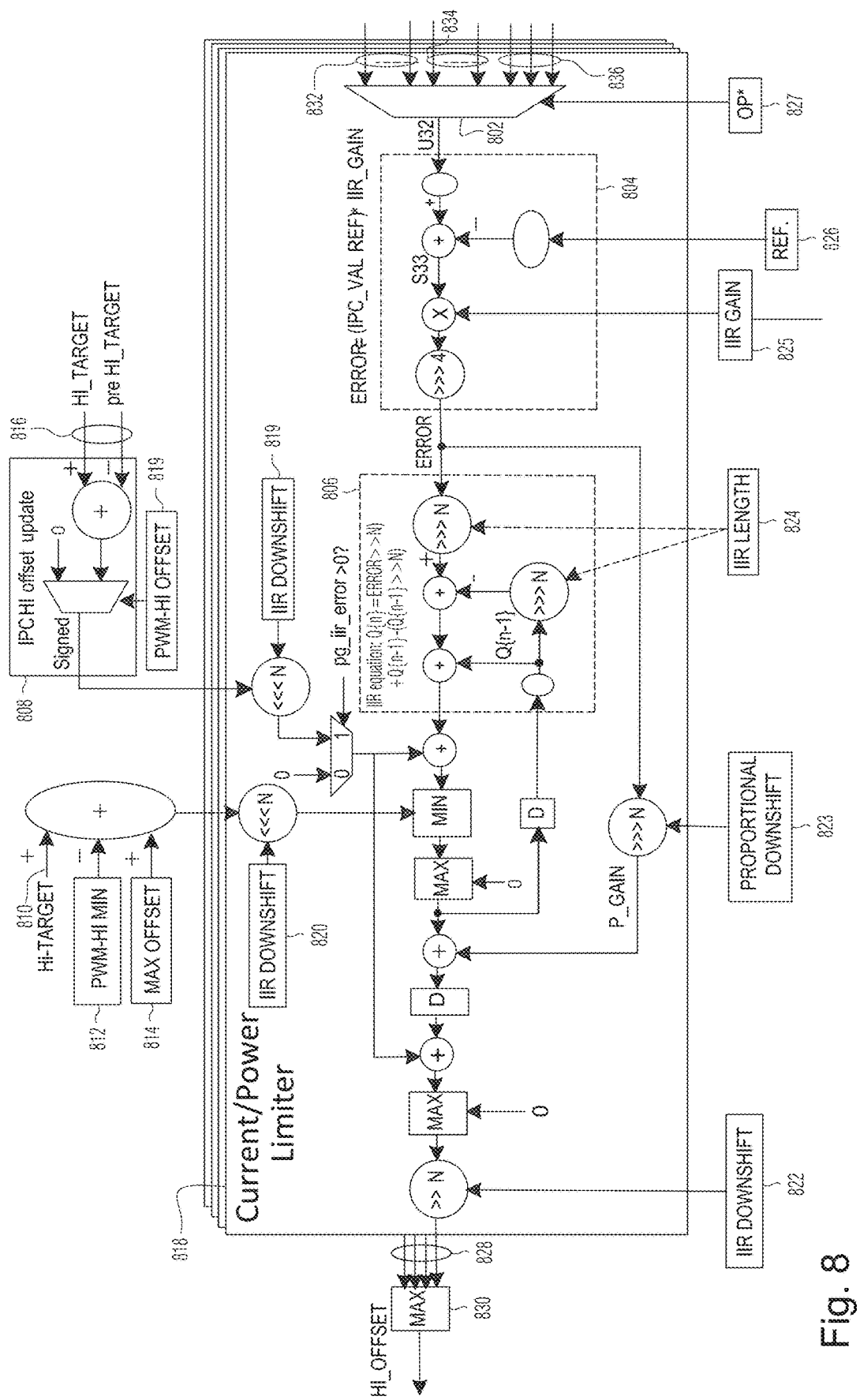
FIG. 8 is a schematic diagram of the current/power limiter in the circuit of FIG. 3, according to certain example embodiments.

Register array and/or memory 730 also receives the 32 MSB of the power 719, and stores the instantaneous per channel pair power results for the current ADC sampling cycle in index/data pair format. Signal 733 provides instantaneous power per channel pair for all channel pairs and each of them could be independently selected to be compared against a software programmed EDPp threshold to decide the amount of voltage/frequency offset to be applied in order to bring power/current back under limit Current/Power Limiter FIG. 8 is a schematic illustration of a current/power limiter 818, such as the current/power limiter 323, according to certain example embodiments.

Each current/power limiter 818 instance can select from any one of the plural (e.g., 12) channels post filter, plural (e.g., 6) channel pair products, and plural block active (e.g., 3 BA) EDP input, that are provided as input. Thus, in some embodiments, the selection may be made from a plurality of different types of input sources (e.g., 12 channels post IIR filter, 6 pair products, and 3 BA peak power configurations), then compare the selected data with software programmed reference value and compute the offset of the actual power compared to the reference values (e.g., HI_OFFSET). The maximum offset output from all active current/power limiter 818 instances may be selected as the value that is subsequently applied to reference voltage or reference clock rate (e.g., PWM VID or NDIV) to bring the current draw down below the budget.

For power saving purposes, in some embodiments, the current/power limiter block may only be active when one or more of following conditions are met: a new ADC sample is coming in for the selected channel (regardless of its value); and new block activity data is available (e.g., only when BA based PWM VID/NDIV offset is enabled).

At the input to the current/power limiter unit 818, a MUX 802 is configured to select from current/voltage channels (e.g., 12 channel post IIR current/voltage result) 832, power channel pairs (e.g., 6 channel pairs power result) 834, and block activity window power to be used as the input (e.g., 3 block activity power sensor results) 836. A signal 827 selects which input source to use as input.

Circuit 804 calculates error=(IPC_VAL−REF)*IIR_GAIN. IPC_VAL is the input source selected from 12 current/voltage channels, 6 power channel pairs and 3 BA window power. REF is software programmed current/power threshold above which is considered as EDP violation. IIR_GAIN is a parameter that needs to be tuned on silicon to decide how much voltage offset needs to be applied for a certain amount of current/power violation. Signal 825 is applied to (IPC_VAL−REF). Signal 826 is a software programmed EDP threshold to be compared against ADC/block activity current/power results.

The circuit 806 provides an IIR filter block to smooth the output voltage offset derived from the EDPp violation detection logic. Signal 824 defines the length of IIR applied to error calculated at circuit 804.

The 808 block adjusts the final HI_OFFSET that is to be applied to PWM VID based on the latest software voltage request (e.g., software PWM_HI). The input 816 to circuit 808 may include the current software requested voltage (e.g., HI_TARGET or the PWM_HI that was requested in the last evaluation), and the previous software requested voltage (e.g., pre HI_TARGET).

In an example, current software HI_TARGET=0.8V, calculated IPC HI_OFFSET=0.05V (i.e. lower NVVDD_L by 0.05V due to EDPp violation), and new SW HI_TARGET=0.9V. In this case, the new IPC HI_OFFSET will be (0.9−0.8)+0.05 V=0.15V to make sure that the effective HI being sent to PWMVID doesn't change. In another example, the current SW HI_TARGET=0.8V, the calculated IPC HI_OFFSET=0.05V, and new SW HI_TARGET=0.7V. In this case, the newly requested HI_TARGET is already below the post offset HI value (0.75V). So no need to apply HI_OFFSET anymore. The new IPC HI_OFFSET will be 0.

The software required voltage target in cases when no EDP violation is seen 810, minimal voltage that chip can run on without functional issue 812, the offset 814 to be added on top of (HI_TARGET−HI_VMIN) are combined, and downshifted, before comparing with the output of block 806. The minimal voltage 812 is the lower bound of the voltage range that chip can operate at with functional accuracy, and the offset 814 caps the current IIR output that will be taken in the next IIR cycle.

Values in registers 820, 821 and 822 are applied to down shift the post-filter results to get the final offset (HI_OFFSET). In certain implementations, internal logic processing may use more bits than the 12-bit PWM voltage format, thus requiring downshift. A proportional downshift of error feedback loop is performed based on register 823. The value of the parameter in register 823 may be tuned to decide the proper voltage scaling factor.

The output of circuit 806 may be combined with the output of circuit 808 (in some implementations, after downshifting 821), and may be further combined with the output of the combination of 810, 812 and 814 (in some implementations, after downshifting 820). This combination may further be combined with the proportionally downshifted error, and, after further combinations and/or downshift 822 operations, provide output 828. Each current/power limiter will output one voltage offset, so, in the illustrated example embodiment having four instances of the current/power limiter, a total four voltage offset results are output. From these, at 830, the maximum offset (max HI_OFFSET) from all active input current limiter will be selected as the value to be applied to PWM VID or NDIV to bring the current draw down below the budget.

Fixed Slew Rate PWM Voltage Control

Figure 9:
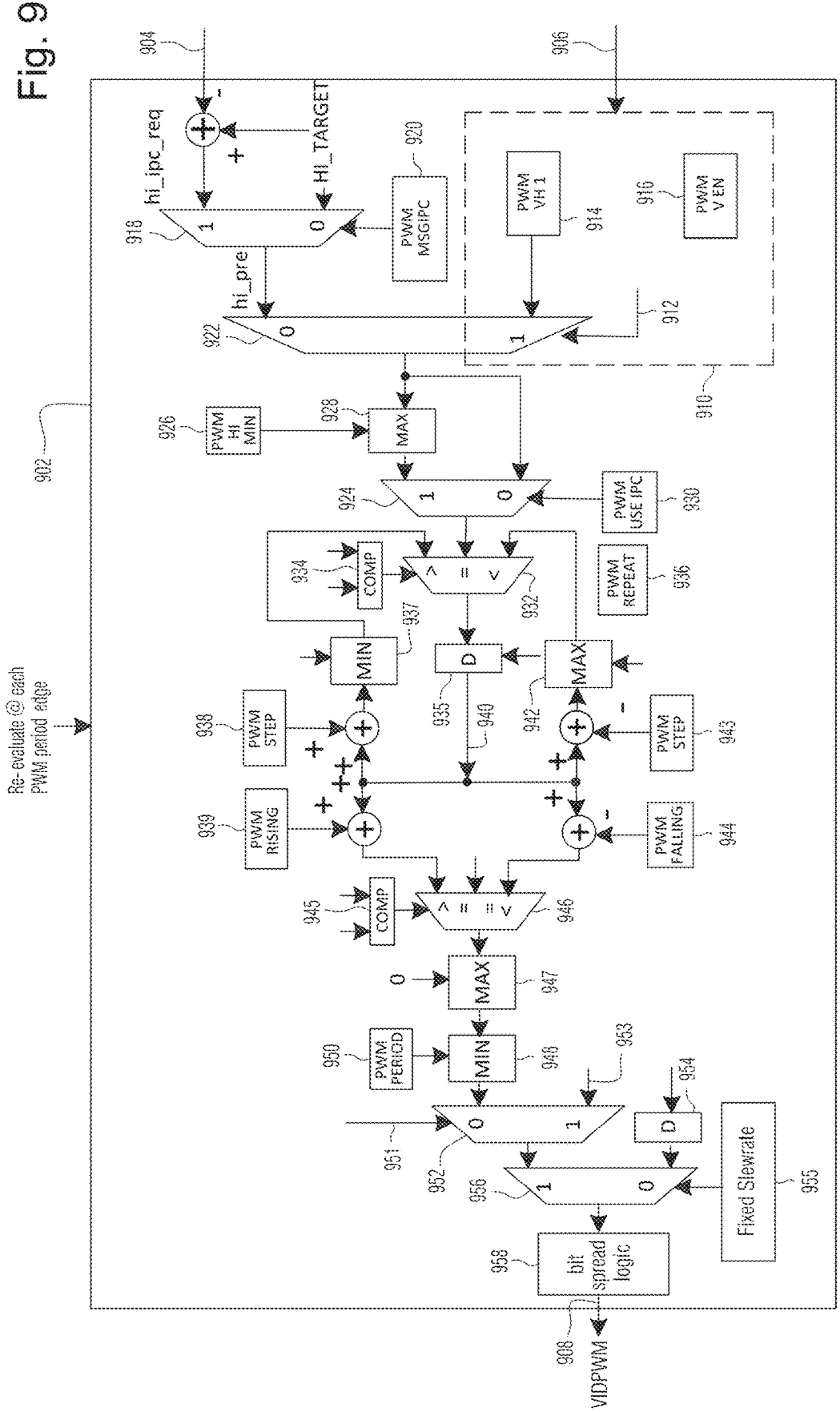
FIG. 9 is a block diagram of fixed slew rate pulse width modulation voltage control unit in the circuit of FIG. 3, according to certain example embodiments.

FIG. 9 is a schematically illustrates a fixed slew rate PWM voltage control circuit, such as, for example, fixed slew rate PWM voltage adjustment circuit 326 and minimum voltage capping circuitry 324, according to certain example embodiments. Certain example embodiments include a fixed slew rate PWM reference voltage adjustment control for all PWM reference voltages (VID) in the chip. FIG. 9 is an example of a fixed slew rate PWM VID (Fixed-slew-rate PWM voltage ID generator) 902 according to an embodiment. With a fixed slew-rate of 10 mV/us, 200 mV may be changed within 20 us. One instance of PWM VID 902 may be instantiated per individually adjusted PWM VID.

Key parameters may include PWM_RISING 939, which is the one time offset that gets added to the current PWM_HI at the beginning of a VIDPWM ramp up phase, PWM_FALLING 944, which is the one time offset that gets subtracted off from the current PWM_HI at the beginning of a VID PWM ramp down phase, PWM_REPEAT 936, which is the number of PWM periods that the fixed slew rate PWM VID controller is going to stay in each step, and PWM_STEP 938/943, which is the step size used in the middle of ramp up and ramp down phase.

Three working modes with different PWM settings may be available: single step, ramp only, and step up—ramp—step down or, step down—ramp—step up. Some example embodiments may enable disabling the fixed slew rate function, and instead, using the legacy 1 step PWM VID control for adjusting voltage. The ramp only technique includes setting PWM_RISING=PWM_FALLING=0 to disable step up and step down during PWMVID switch. The technique of step up—ramp—step down OR step down—ramp—step up is the intended mode if everything works fine.

The channel selection ADC MUX selection signal output may be implemented in different ways. "Ring counter mode" is a technique in some embodiments for as POR for an example processor. In the "ring counter mode (POR)". All channels share the same PWM duty cycle. The external MUX solely counts on the number of PWM pulses to cycle through each channel one by one. GPU doesn't have the ability to tell the external MUX which specific channel to choose. The duty cycle may be software configurable. In certain embodiments, the duty cycle may be configured at 50%. In another embodiment, each channel may be configured with its own duty cycle.

The fixed slew rate PWM VID generator 902 receives as input the max voltage offset 904 from all (e.g., 4 instances) instances of current/power limiter module to be applied to offset software requested voltage value, and the low voltage request signal 906 which is asserted when graphic units detects high power instructions in the pipe which requires the voltage to be lowered to some safe voltage programmed by software. The output of the PWM VID generator 902 is the VID PWM output 908 to voltage regulator to specify the voltage value.

The low voltage request signal 906 is input to block 910 which lowers the voltage when detecting high power instructions in the graphic pipe to prevent EDP violations. Block 910 includes input 912 for when a high power instruction detected in the graphic pipe and safe voltage feature is enabled so lower the voltage, a safe voltage value 914 at which it's safe for graphic pipe to execute high power instructions, and enable/disable 916 for the safe voltage protection feature.

The input maximum voltage offset 904 is provided to MUX 918 where, if the on-chip ADC sensing feature is enabled, the offset voltage is applied to software programmed target voltage (e.g., HI_TARGET). Otherwise, the software programmed target voltage is used directly. The enabling/disabling of on-chip ADC feature is controlled by register 920 with respect to 918.

Mux 922 selects whether the safe voltage (as provided by block 910) or the post ADC sensing offset voltage (as provided by MUX 918) should be used.

Register 926 provides the minimal voltage that the chip can run on without functional issues. This is the lower bound of the voltage range that the chip can operation at. Block 928 bounds the requested voltage to voltage regulator so that GPU doesn't lower the voltage below the minimum voltage (VMIN) under which chip can't operate correctly. In accordance with a register 930 which enables/disables the on-chip ADC feature, another MUX 924 selects from VMIN capped post ADC sensing offset voltage (received from block 928) or the software requested voltage (which bypasses block 928).

The output of MUX 924 is provided to MUX 932 which selects the next active output voltage value based on the comparison result of the current voltage and the target voltage. Block 934 operates to check if the current voltage is above, below or at the target voltage. A D-flop stage 935 stores the target voltage value. Then 940 is the current voltage that is seen on the voltage regulator side.

Current 940 is looped back to MUX 932, in a first path via 937 which bounds the voltage so that hardware doesn't exceed the target voltage and in a second path via 942 which bound the voltage so that HW doesn't drop below the target voltage. This may be controlled by a step size (as specified in registers 938 and 943) used in the PWM VID ramp up and ramp down phase.

A register 936 may specify the number of PWM periods that the fixed slew rate PWM VID controller is going to stay in each step.

Yet another MUX 946 receives current 940 via a first path where a one time offset 939 gets added to the current voltage output at the beginning of a VID PWM ramp up phase, and a second path in which a one time offset 944 that gets subtracted off from the current voltage output at the beginning of a VID PWM ramp down phase. In connection with MUX 946, a block 945 checks if the current voltage is above, below or at the target voltage. Block 946 selects the next active output voltage value based on the comparison result of the current voltage and the target voltage.

Blocks 947 and 948 respectively processes the output of MUX 946 to ensure that the target PWM_HI (the value that is being requested) is greater than or equal to 0, and that target PWM_HI is less than the PWM period (register 950 defines the period of the PWM waveform) before it is provided as input to MUX 952.

Signal 951 to MUX 952 signals that hardware is moving in one direction when a new software target voltage comes in requesting moving in the other direction. This is so called target direction changed event. At MUX 952, when the target direction changed, we will finish the current PWM period, not PWM_REPEAT*PWM period, then stay at HI NOW (what the circuit thinks the actual voltage seen by the reference) for one extra PWM period before moving toward the new target. Signal 953 is the current voltage that is seen on the voltage regulator side, as input to MUX 952.

The output of MUX 952 is provided to another MUX 956. At MUX 956, if fixed-slew-rate feature is disabled, hardware moves to the target voltage in 1 step. If fixed-slew-rate feature is enabled, hardware moves to the target voltage in multiple steps based on software programmed step size. Final post IPC offset target voltage 954 is also input to MUX 956.

Register 955 enables/disables the fixed-slew-rate PWM-VID feature. When fixed-slew-rate feature is disabled, hardware will move to the target voltage in 1 step.

At block 958, bit-spread logic generates the PWM signal 908 using the highest frequency waveform possible. This reduces the RC time constant of any external filtering circuit, which allows the use of smaller/cheaper parts.

Performance of Embodiments

Figure 10:
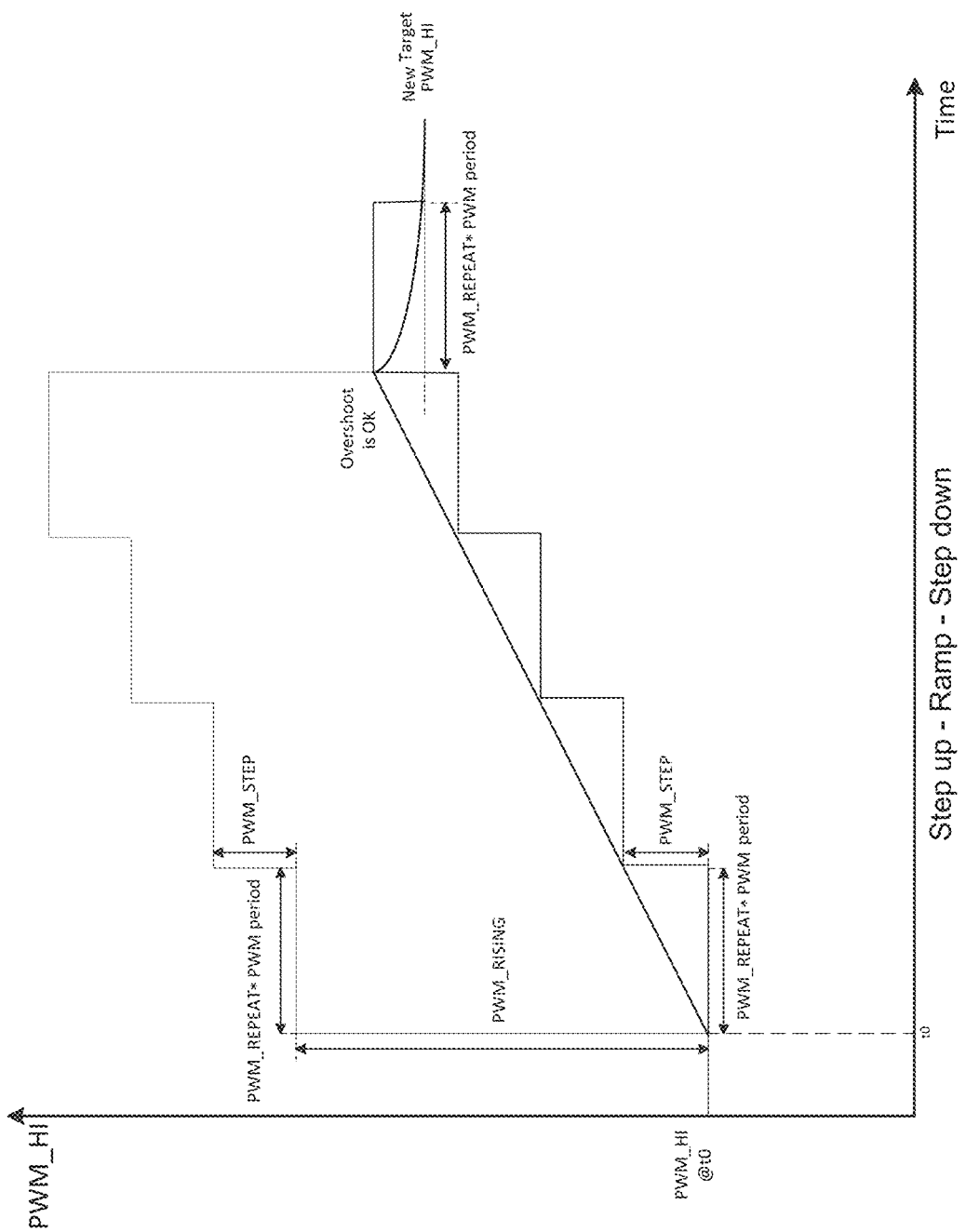
FIG. 10 and FIG. 11 illustrate fixed slew rate voltage adjustment with the target direction being unchanged, according to some example embodiments.
Figure 11:
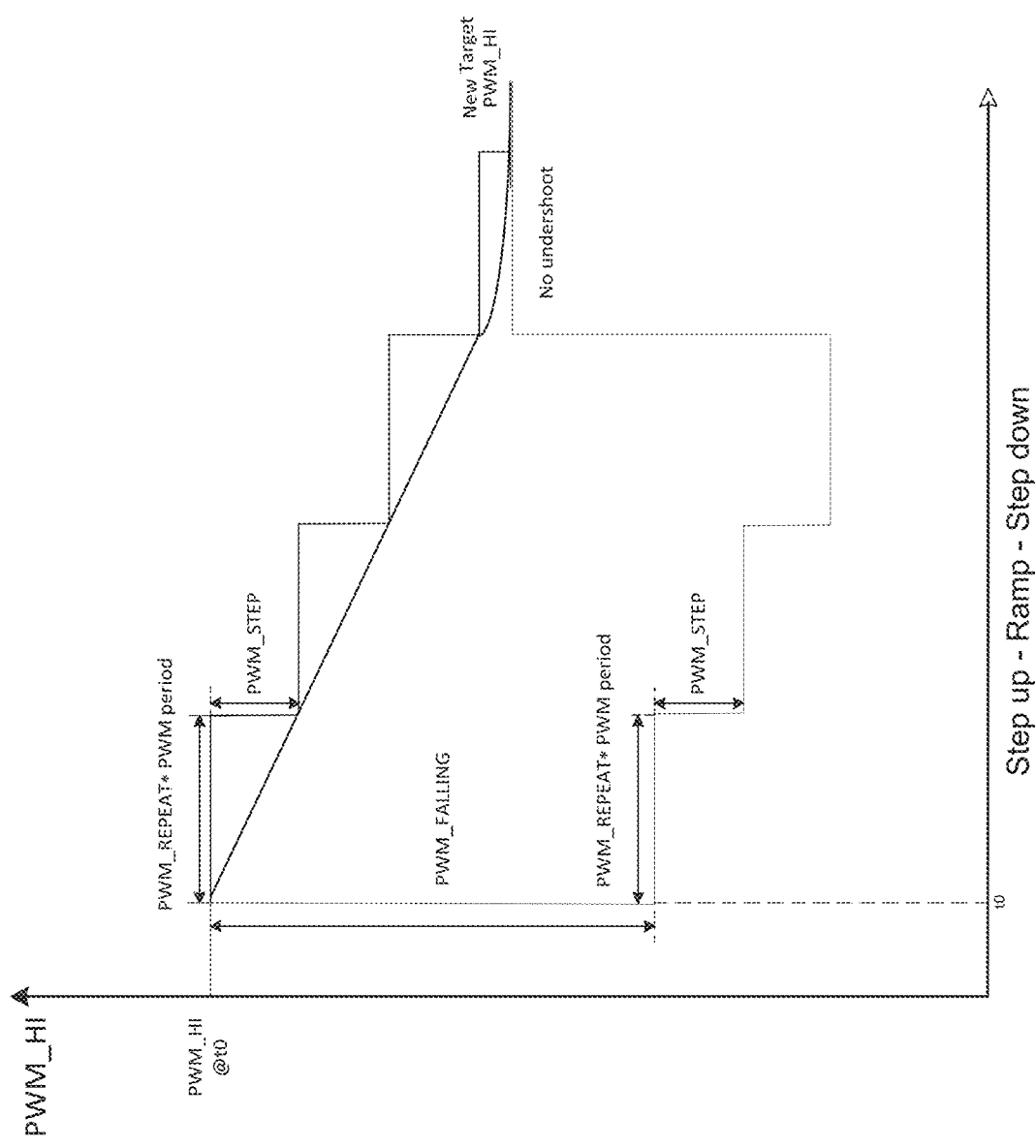

FIG. 10 and FIG. 11 illustrate changing the target voltage at a fixed slew rate with the target direction (e.g., increase or decrease) being unchanged. It shows how fixed slew rate—target direction unchanged works. Hardware is moved towards the target voltage in multiple steps and, at each step, the changed voltage is maintained for a software programmable amount of time.

Figure 12:
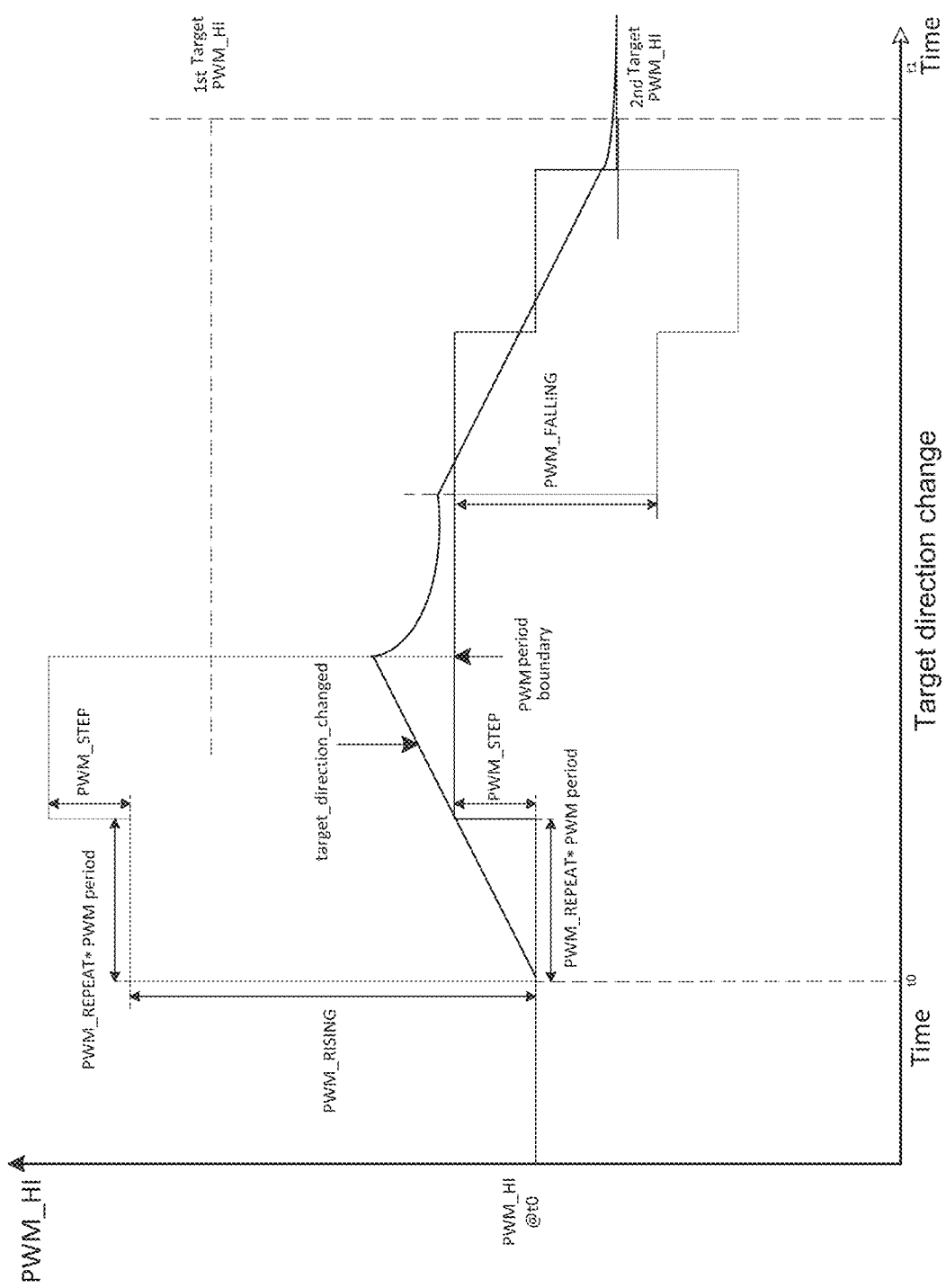
FIG. 12 illustrates fixed slew rate voltage adjustment with the target direction being changed, according to some example embodiments.

FIG. 12 illustrates fixed slew rate movement of the target voltage, with the target direction being changed. When target direction change occurs, example embodiments may complete the current PWM period (rather than PWM_REPEAT*PWM period), then stay at HI NOW for one extra PWM period before moving toward the new (direction changed) target.

Figure 13:
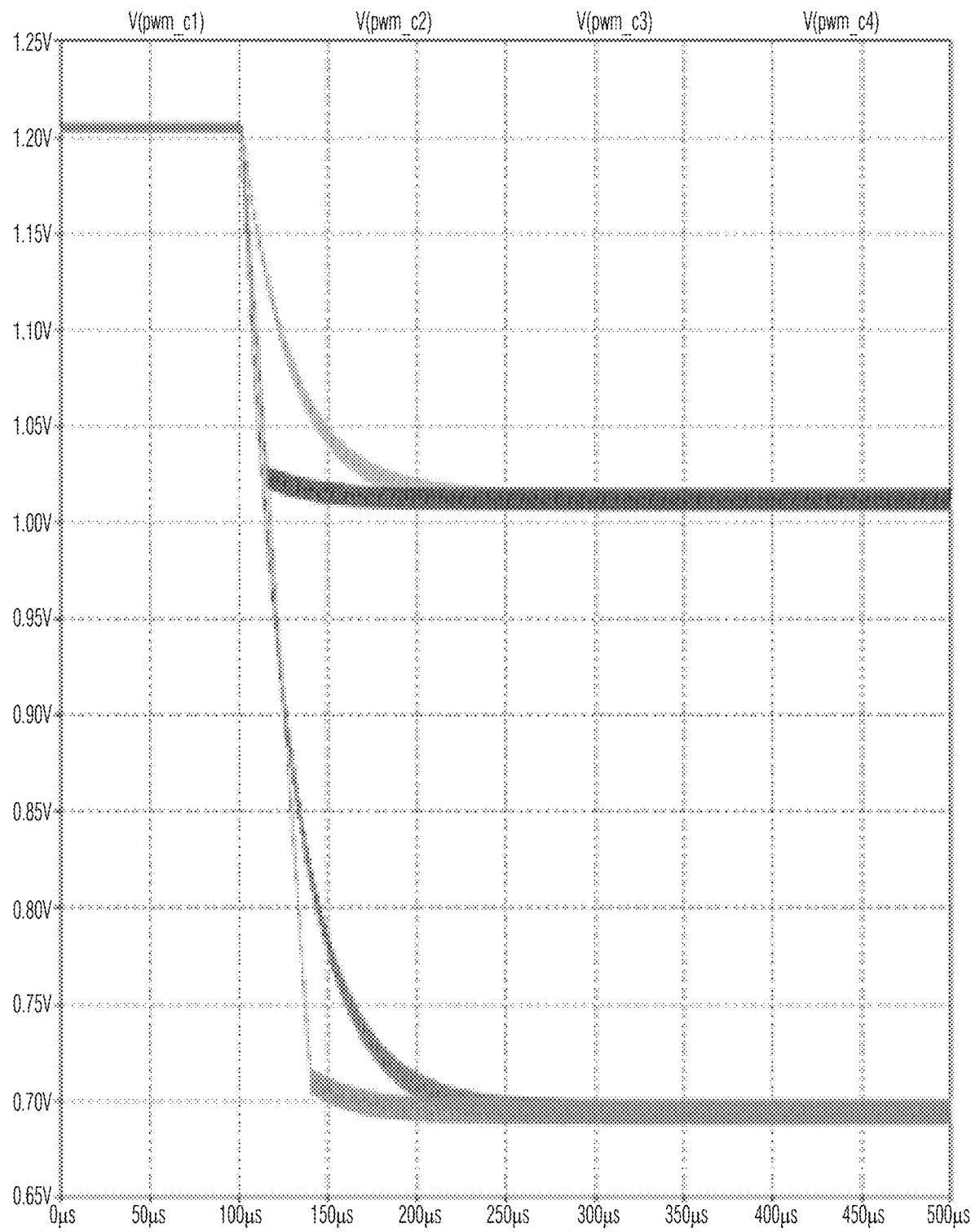
FIG. 13 and FIG. 14 illustrate a comparison of the new fixed slew rate pulse width modulation voltage control, according to certain example embodiments with legacy non-fixed rate pulse width modulation voltage control.
Figure 14:
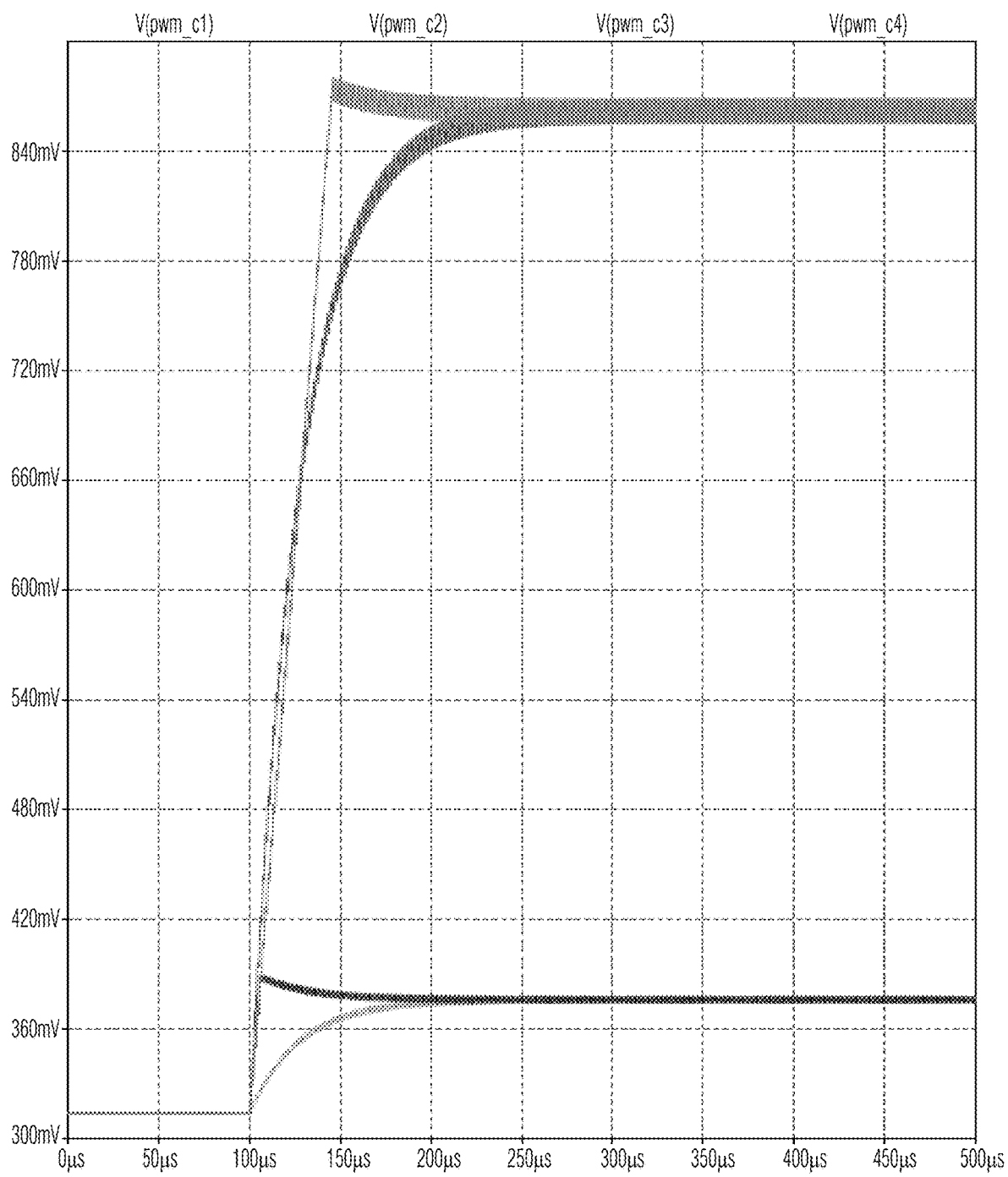

FIG. 13 and FIG. 14 illustrate a comparison of the new fixed slew rate PWM target voltage changing according to certain example embodiments with legacy non-fixed rate PWM target voltage changing. FIG. 13 illustrates the voltage ramp down response of legacy non fixed slew rate technique in comparison with the new fixed slew rate technique according to example embodiments. FIG. 14 illustrates voltage ramp up response of legacy non fixed slew rate technique in comparison with the new fixed slew rate technique according to example embodiments.

Further On-Chip ADC Power Limiting Embodiments

Figure 15:
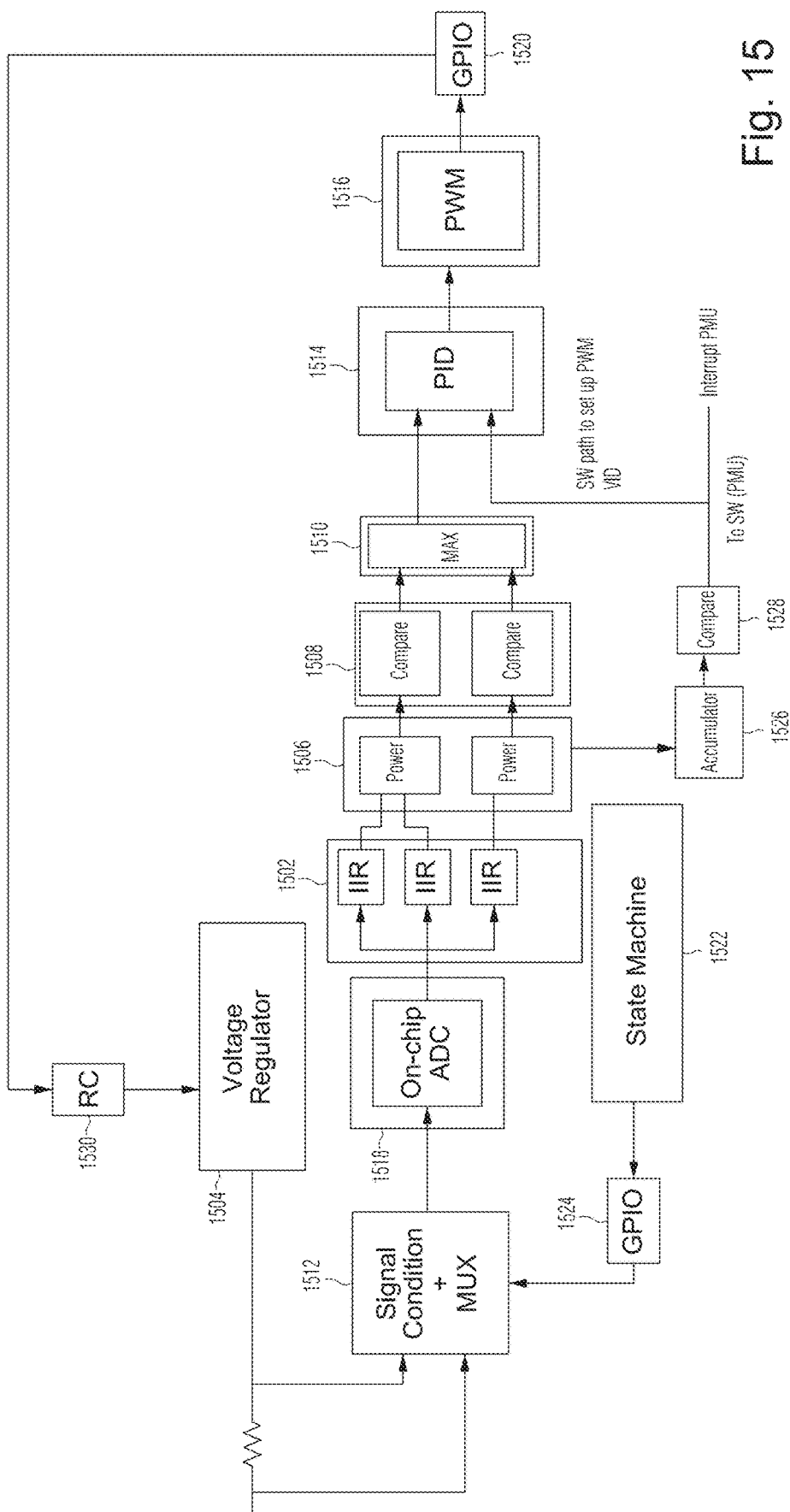
FIG. 15 is another block diagram of a circuit providing overcurrent control using an on-chip ADC, according to certain example embodiments.

FIG. 15 schematically illustrates a circuit providing overcurrent control technique using an on-chip ADS, according to another example embodiment.

An on-board signal conditioner and MUX 1512 cycles through each individual current/voltage channel to be monitored by a processor's on-chip circuitry including an on-chip ADC 1518. The on-chip ADC 1518 samples the current/voltage from the selected channel and outputs a digital signal (e.g., a 7-bit digital signal) to downstream logic. The downstream logic includes a filter (e.g., an IIR filter) circuitry 1502 to filter out the noise of sampled raw ADC output results. The circuitry may first left shifts (e.g., by 25 bits) the raw ADC output to make use of all available bits (e.g., 32 bits) during the operation to mitigate the precision loss caused by raw data filtering. The downstream logic also includes a DSP/MAC unit that includes circuitry 1506, 1508, 1510, 1526 and 1528. Circuitry 1506, based on the output from the filter 1502 determines power=current*voltage. At current/voltage limiter circuitry 1508, each current/voltage limiter instance may be configured to select data from any one of plural inputs from plural sources (e.g., 12 channel post IIR+6 channel pair product+3 BA EDP input for a total 21 input sources), then compare the selected data with software programmed reference value(s), and compute the offset (e.g., the 12 bit HI_OFFSET). Then at max determination circuitry 1510, the maximum voltage offset is chosen from among all instances (e.g., 4 instances) of the current/power limiter circuitry applied to the software requested voltage value.

The power determinations of circuitry 1506 is also provided to block 1526 for accumulation of per channel pair power results. At block 1528, the accumulated power results in block 1528 (or registers in block 1528) are compared with software programmed thresholds. One or more software interrupts may be triggered if power exceeds threshold. The exceeding may be determined based upon a single measurement sample, a plurality of measurement samples, and/or an average power based on a plurality of measurement samples.

The output from the max determination circuitry 1510 and the output from compare circuitry 1528, both are provided to circuitry PID-control circuitry 1514. At circuitry 1514, if the on-chip ADC feature is enabled, the offset voltage is applied to a software programmed target voltage. Otherwise the software programmed target voltage may be used directly.

At the PWM logic circuitry 1516, the target voltage, as determined by circuitry 1514, is converted to one-wire PWM output connected to the voltage regulator. Circuitry 1520 corresponds to the GPIO pad through which PWM signal is sent to external voltage regulator 1504 to change the voltage. The signal from the GPIO pad 1520 to voltage regulator 1504 is provided through an on-board RC network 1530.

State machine 1522 drives the output MUX selection signal based on the timing programmed by software to cycle through each individual channel. A 1-bit ADC MUX selection signal is connected to the on-board MUX 1512 through the GPIO pad 1524.

Figure 16:
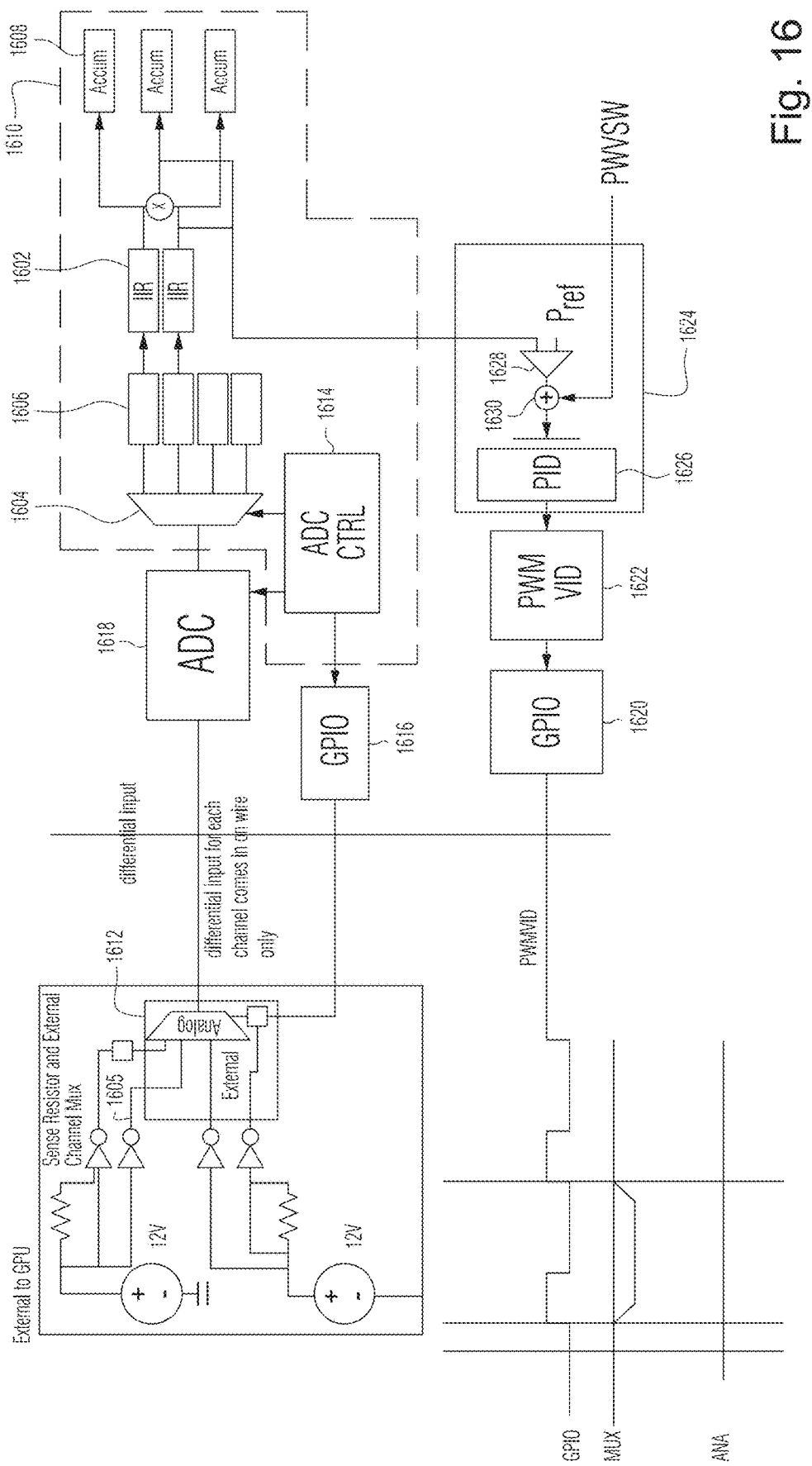
FIG. 16 is another block diagram of a circuit providing overcurrent control using an on-chip ADC, according to certain example embodiments.

FIG. 16 is another block diagram of a circuit providing overcurrent control using an on-chip ADC, according to certain example embodiments.

The on-chip ADC sensor 1618 samples the current/voltage from a selected channel and outputs a digital signal (e.g., a 7-bit digital signal) to downstream logic 1610. Differential input for each channel comes into the on-chip ADC on wire only, from a signal conditioning and analog MUX 1612. The signal conditioning and MUX 1612 multiplexes between a plurality of input current/voltage rails 1605. The signal conditioning in 1612 includes a sense register associated with each input rail.

Downstream logic 1610 may include one or more digital signal processing units including a software programmable IIR filter, and circuitry to multiply input current/voltage to calculate power and to accumulate the calculated power numbers so that software can get an averaged power at any arbitrary interval. In downstream logic 1610, a selector circuitry 1604 selects the currently active channel from the time division multiplexed stream sensed samples shared by all current/voltage channels. The selector circuitry 1604 outputs per channel raw current/voltage ADC output 1606 to be fed into the IIR filter circuitry 1602. The IIR filter circuitry 1602 filters out the noise in the sampled raw ADC output results. The filtering process may include mitigating precision loss that may result from the noise removal. For example, in some embodiments, circuitry 1602 may first left shift the raw ADC output by some number of bits to make use of all the bits available bits (e.g., left shift 25 bits to ensure the total of 32 bit precision) during the operation to mitigate the precision loss caused by raw data filtering. The filtered current/voltage samples are multiplied and accumulated in a register array 1608 as per channel pair power results. The ADC control circuitry 1614 is responsible to select a particular channel in the MUX 1612 to be sampled, and to accordingly signal the downstream logic 1610 and the ADC 1618 with the selected channel identifier. The 1-bit ADC MUX selection signal is connected from the GPIO pad 1616 to the on-board MUX 1612.

Block 1624 includes one or more instances of a current/power limiter. Each current/power limiter instance 1628 can select from any one of a plurality of sources, e.g., from 12 channel post IIR and 6 channel pair product and 3 BA EDP input for a total 21 input sources. It then compares the selected data with software programmed reference value(s) and computes the offset (e.g., 12 bit HI_OFFSET).

At 1630, if the on-chip ADC sensing feature is enabled, the offset voltage is applied to software programmed target voltage. Otherwise the software programmed target voltage is used directly. At 1626, the target voltage ID is converted to one-wire PWM output to cause the voltage regulator to change the voltage. The adjustment to PWM VID to be applied to the external voltage regulator is determined at 1622. The PWM VID signal is sent to external voltage regulator, to change its output voltage, through GPIO pad 1620.

As described above, conventional GPU's have been limited to the use of mechanisms such as external measurements (e.g., INA-based measurements) to protect the voltage regulator input side EDPp. Such mechanisms however requires in 10-100 milliseconds, which leaves the GPU internal components vulnerable to damage and/or for the GPU to be shutdown and dropped off the communication buses. The other EDPp protection mechanism in conventional GPU's is block active EDPp (BA EDPp) which is implemented on the voltage regulator output, not input, and typically only monitors activity/power on the VDD rail, and is thus not suitable for voltage regulator input rail capping.

The novel on-chip ADC-based overcurrent detector (aka "droopy-on-die") and current/power control rectifies many weaknesses of the conventional chips, including chips that implemented the ADC off chip. In contrast to the 10-100 ms response time to EDPp events in the conventional techniques, the embodiments provide response times in the 100 us timescale, e.g., when an EDPp event happens, voltage is dropped within 100 us in response to the EDPp event. In some embodiments, frequency drop is obtained for free since clock frequency is tied to voltage (e.g., with NAFLL).

In one embodiment, the on-chip ADC feature may have the following parameters: response time at 10 kHz (100 us); external MUX settling time at 100 ns; ADC/DSP at 200 ns/channel, 2.4 us to cycle through all 12 channels; ADC resolution 7-bit 200 mA/100 mV per bit 25A/per channel 12V; PWMVID 8.8 kHz BW; voltage regulator 10-50 kHz; fixed slew rate 10 mV/us; PWMVID; and NAFLL. With a fixed slew-rate 10 mV/us which the voltage regulator is capable of tracking, the embodiment can change 200 mV within 20 us. To meet the 100 us response time (10 kHz), it is only required to keep actuation delay to 80 us of less. This 80 us includes the latency of path: external MUX→on-chip ADC→IIR filter and MAC→current/power limiter→fixed slew rate pulse width modulation VID. During this 80 us, 33 samples for each channel can be obtained (e.g., considering 6-channel pairs, worst case).

GPUs with an on-chip ADC according to embodiments have substantially faster response times to overcurrent events, and are accordingly usable in computing environments which require high levels of reliability. GPUs and SoCs including one or more GPUs according to embodiments can be implemented in data centers, server environments, gaming computers, laptop computers, and other computing environments. Embodiments may also be used in environment such as autonomous vehicles, robots, and the like. For example, embodiments may improve the operational reliability of autonomous vehicle applications by ensuring that the GPU does not even momentarily fall off the communication bus due to overcurrent situations. Embodiments may also improve the power consumption of autonomous (or other) vehicles by implementing a faster power management response.

Embodiments, however, are not limited to GPUs and SoC including GPUs. Other embodiments may provide on-chip ADC on CPU chips, or other types of processors.

More illustrative information will now be set forth regarding various optional architectures and features with which the foregoing framework may or may not be implemented, per the desires of the user. It should be strongly noted that the following information is set forth for illustrative purposes and should not be construed as limiting in any manner Any of the following features may be optionally incorporated with or without the exclusion of other features described.

Parallel Processing Architecture

Figure 17:
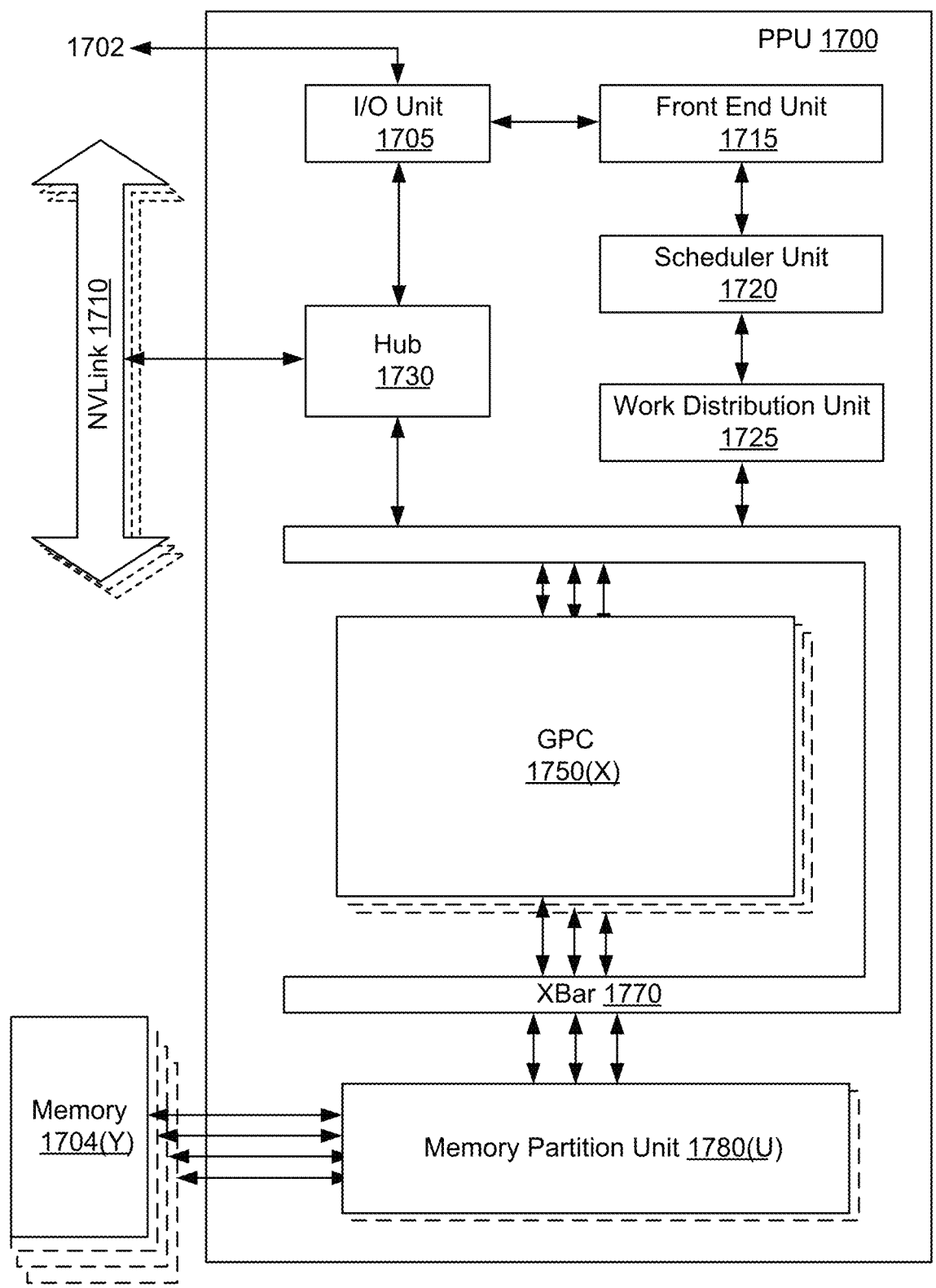
FIG. 17 illustrates a parallel processing unit such as, for example, the GPU described in relation to FIGS. 1-3, in accordance with an embodiment.

FIG. 17 illustrates a parallel processing unit (PPU) 1700, in accordance with an embodiment. In an embodiment, the PPU 1700 is a multi-threaded processor that is implemented on one or more integrated circuit devices. The PPU 1700 is a latency hiding architecture designed to process many threads in parallel. A thread (i.e., a thread of execution) is an instantiation of a set of instructions configured to be executed by the PPU 1700. In an embodiment, the PPU 1700 is a graphics processing unit (GPU, for example, such as that described in relation to FIGS. 1 and 3) configured to implement a graphics rendering pipeline for processing three-dimensional (3D) graphics data in order to generate two-dimensional (2D) image data for display on a display device such as a liquid crystal display (LCD) device. In other embodiments, the PPU 1700 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same One or more PPUs 1700 may be configured to accelerate thousands of High Performance Computing (HPC), data center, and machine learning applications. The PPU 1700 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 17, the PPU 1700 includes an Input/Output (I/O) unit 1705, a front end unit 1715, a scheduler unit 1720, a work distribution unit 1725, a hub 1730, a crossbar (Xbar) 1770, one or more general processing clusters (GPCs) 1750, and one or more partition units 1780. The PPU 1700 may be connected to a host processor or other PPUs 1700 via one or more high-speed NVLink 1710 interconnect. The PPU 1700 may be connected to a host processor or other peripheral devices via an interconnect 1702. The PPU 1700 may also be connected to a local memory comprising a number of memory devices 1704. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 1710 interconnect enables systems to scale and include one or more PPUs 1700 combined with one or more CPUs, supports cache coherence between the PPUs 1700 and CPUs, and CPU mastering. Data and/or commands may be transmitted by the NVLink 1710 through the hub 1730 to/from other units of the PPU 1700 such as one or more copy engines, a video encoder, a video decoder, a power management unit, etc. (not explicitly shown). The NVLink 1710 is described in more detail in conjunction with FIG. 19B.

The I/O unit 1705 is configured to transmit and receive communications (i.e., commands, data, etc.) from a host processor (not shown) over the interconnect 1702. The I/O unit 1705 may communicate with the host processor directly via the interconnect 1702 or through one or more intermediate devices such as a memory bridge. In an embodiment, the I/O unit 1705 may communicate with one or more other processors, such as one or more of the PPUs 1700 via the interconnect 1702. In an embodiment, the I/O unit 1705 implements a Peripheral Component Interconnect Express (PCIe) interface for communications over a PCIe bus and the interconnect 1702 is a PCIe bus. In alternative embodiments, the I/O unit 1705 may implement other types of well-known interfaces for communicating with external devices.

The I/O unit 1705 decodes packets received via the interconnect 1702. In an embodiment, the packets represent commands configured to cause the PPU 1700 to perform various operations. The I/O unit 1705 transmits the decoded commands to various other units of the PPU 1700 as the commands may specify. For example, some commands may be transmitted to the front end unit 1715. Other commands may be transmitted to the hub 1730 or other units of the PPU 1700 such as one or more copy engines, a video encoder, a video decoder, a power management unit, etc. (not explicitly shown). In other words, the I/O unit 1705 is configured to route communications between and among the various logical units of the PPU 1700.

In an embodiment, a program executed by the host processor encodes a command stream in a buffer that provides workloads to the PPU 1700 for processing. A workload may comprise several instructions and data to be processed by those instructions. The buffer is a region in a memory that is accessible (i.e., read/write) by both the host processor and the PPU 1700. For example, the I/O unit 1705 may be configured to access the buffer in a system memory connected to the interconnect 1702 via memory requests transmitted over the interconnect 1702. In an embodiment, the host processor writes the command stream to the buffer and then transmits a pointer to the start of the command stream to the PPU 1700. The front end unit 1715 receives pointers to one or more command streams. The front end unit 1715 manages the one or more streams, reading commands from the streams and forwarding commands to the various units of the PPU 1700.

The front end unit 1715 is coupled to a scheduler unit 1720 that configures the various GPCs 1750 to process tasks defined by the one or more streams. The scheduler unit 1720 is configured to track state information related to the various tasks managed by the scheduler unit 1720. The state may indicate which GPC 1750 a task is assigned to, whether the task is active or inactive, a priority level associated with the task, and so forth. The scheduler unit 1720 manages the execution of a plurality of tasks on the one or more GPCs 1750.

The scheduler unit 1720 is coupled to a work distribution unit 1725 that is configured to dispatch tasks for execution on the GPCs 1750. The work distribution unit 1725 may track a number of scheduled tasks received from the scheduler unit 1720. In an embodiment, the work distribution unit 1725 manages a pending task pool and an active task pool for each of the GPCs 1750. The pending task pool may comprise a number of slots (e.g., 32 slots) that contain tasks assigned to be processed by a particular GPC 1750. The active task pool may comprise a number of slots (e.g., 4 slots) for tasks that are actively being processed by the GPCs 1750. As a GPC 1750 finishes the execution of a task, that task is evicted from the active task pool for the GPC 1750 and one of the other tasks from the pending task pool is selected and scheduled for execution on the GPC 1750. If an active task has been idle on the GPC 1750, such as while waiting for a data dependency to be resolved, then the active task may be evicted from the GPC 1750 and returned to the pending task pool while another task in the pending task pool is selected and scheduled for execution on the GPC 1750.

The work distribution unit 1725 communicates with the one or more GPCs 1750 via XBar 1770. The XBar 1770 is an interconnect network that couples many of the units of the PPU 1700 to other units of the PPU 1700. For example, the XBar 1770 may be configured to couple the work distribution unit 1725 to a particular GPC 1750. Although not shown explicitly, one or more other units of the PPU 1700 may also be connected to the XBar 1770 via the hub 1730.

The tasks are managed by the scheduler unit 1720 and dispatched to a GPC 1750 by the work distribution unit 1725. The GPC 1750 is configured to process the task and generate results. The results may be consumed by other tasks within the GPC 1750, routed to a different GPC 1750 via the XBar 1770, or stored in the memory 1704. The results can be written to the memory 1704 via the partition units 1780, which implement a memory interface for reading and writing data to/from the memory 1704. The results can be transmitted to another PPU 1704 or CPU via the NVLink 1710. In an embodiment, the PPU 1700 includes a number U of partition units 1780 that is equal to the number of separate and distinct memory devices 1704 coupled to the PPU 1700. A partition unit 1780 will be described in more detail below in conjunction with FIG. 18B.

In an embodiment, a host processor executes a driver kernel that implements an application programming interface (API) that enables one or more applications executing on the host processor to schedule operations for execution on the PPU 1700. In an embodiment, multiple compute applications are simultaneously executed by the PPU 1700 and the PPU 1700 provides isolation, quality of service (QoS), and independent address spaces for the multiple compute applications. An application may generate instructions (i.e., API calls) that cause the driver kernel to generate one or more tasks for execution by the PPU 1700. The driver kernel outputs tasks to one or more streams being processed by the PPU 1700. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 19A.

Figure 18A:
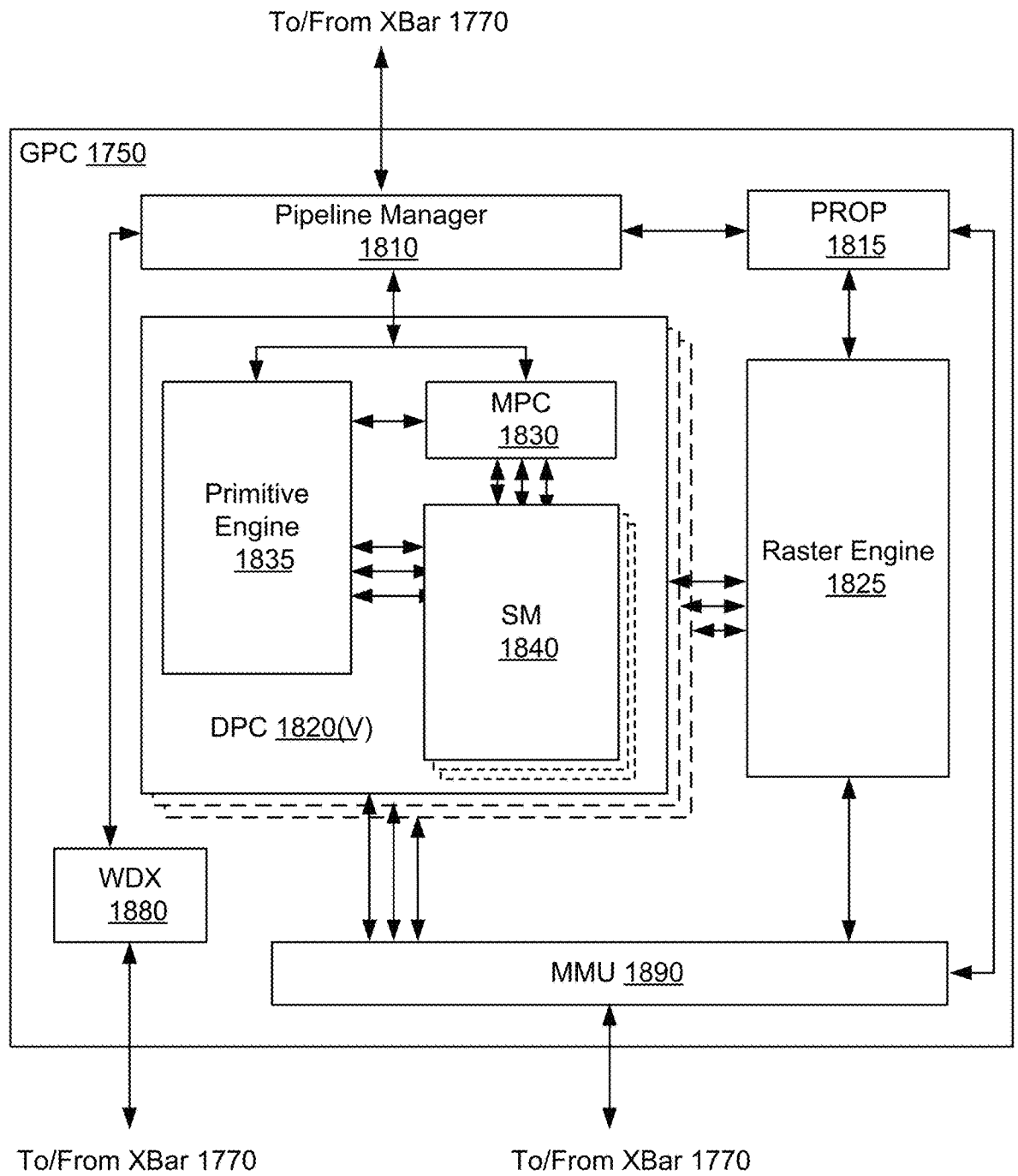
FIG. 18A illustrates a general processing cluster within the parallel processing unit of FIG. 17, in accordance with an embodiment.

FIG. 18A illustrates a GPC 1750 of the PPU 1700 of FIG. 17, in accordance with an embodiment. As shown in FIG. 18A, each GPC 1750 includes a number of hardware units for processing tasks. In an embodiment, each GPC 1750 includes a pipeline manager 1810, a pre-raster operations unit (PROP) 1815, a raster engine 1825, a work distribution crossbar (WDX) 1880, a memory management unit (MMU) 1890, and one or more Data Processing Clusters (DPCs) 1820. It will be appreciated that the GPC 1750 of FIG. 18A may include other hardware units in lieu of or in addition to the units shown in FIG. 18A.

In an embodiment, the operation of the GPC 1750 is controlled by the pipeline manager 1810. The pipeline manager 1810 manages the configuration of the one or more DPCs 1820 for processing tasks allocated to the GPC 1750. In an embodiment, the pipeline manager 1810 may configure at least one of the one or more DPCs 1820 to implement at least a portion of a graphics rendering pipeline. For example, a DPC 1820 may be configured to execute a vertex shader program on the programmable streaming multiprocessor (SM) 1840. The pipeline manager 1810 may also be configured to route packets received from the work distribution unit 1725 to the appropriate logical units within the GPC 1750. For example, some packets may be routed to fixed function hardware units in the PROP 1815 and/or raster engine 1825 while other packets may be routed to the DPCs 1820 for processing by the primitive engine 1835 or the SM 1840. In an embodiment, the pipeline manager 1810 may configure at least one of the one or more DPCs 1820 to implement a neural network model and/or a computing pipeline.

Figure 18B:
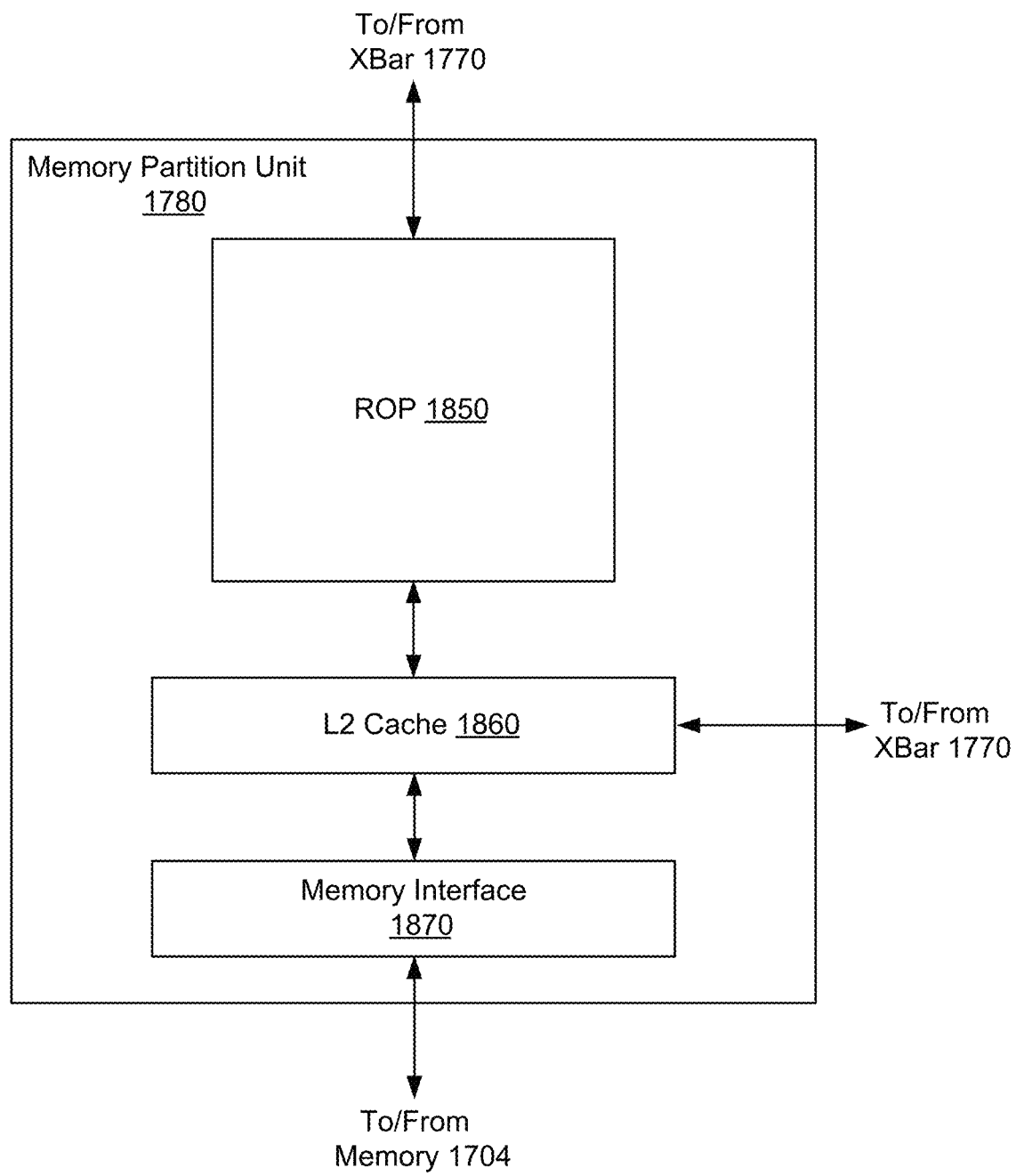
FIG. 18B illustrates a memory partition unit of the parallel processing unit of FIG. 17, in accordance with an embodiment.

The PROP unit 1815 is configured to route data generated by the raster engine 1825 and the DPCs 1820 to a Raster Operations (ROP) unit, described in more detail in conjunction with FIG. 18B. The PROP unit 1815 may also be configured to perform optimizations for color blending, organize pixel data, perform address translations, and the like.

The raster engine 1825 includes a number of fixed function hardware units configured to perform various raster operations. In an embodiment, the raster engine 1825 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and non-culled fragments are transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 1825 comprises fragments to be processed, for example, by a fragment shader implemented within a DPC 1820.

Each DPC 1820 included in the GPC 1750 includes an M-Pipe Controller (MPC) 1830, a primitive engine 1835, and one or more SMs 1840. The MPC 1830 controls the operation of the DPC 1820, routing packets received from the pipeline manager 1810 to the appropriate units in the DPC 1820. For example, packets associated with a vertex may be routed to the primitive engine 1835, which is configured to fetch vertex attributes associated with the vertex from the memory 1704. In contrast, packets associated with a shader program may be transmitted to the SM 1840.

The SM 1840 comprises a programmable streaming processor that is configured to process tasks represented by a number of threads. Each SM 1840 is multi-threaded and configured to execute a plurality of threads (e.g., 32 threads) from a particular group of threads concurrently. In an embodiment, the SM 1840 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 1840 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 1840 will be described in more detail below in conjunction with FIG. 19A.

The MMU 1890 provides an interface between the GPC 1750 and the partition unit 1780. The MMU 1890 may provide translation of virtual addresses into physical addresses, memory protection, and arbitration of memory requests. In an embodiment, the MMU 1890 provides one or more translation lookaside buffers (TLBs) for performing translation of virtual addresses into physical addresses in the memory 1704.

FIG. 18B illustrates a memory partition unit 1780 of the PPU 1700 of FIG. 17, in accordance with an embodiment. As shown in FIG. 18B, the memory partition unit 1780 includes a Raster Operations (ROP) unit 1850, a level two (L2) cache 1860, and a memory interface 1870. The memory interface 1870 is coupled to the memory 1704. Memory interface 1870 may implement 32, 64, 128, 1024-bit data buses, or the like, for high-speed data transfer. In an embodiment, the PPU 1700 incorporates U memory interfaces 1870, one memory interface 1870 per pair of partition units 1780, where each pair of partition units 1780 is connected to a corresponding memory device 1704. For example, PPU 1700 may be connected to up to Y memory devices 1704, such as high bandwidth memory stacks or graphics double-data-rate, version 5, synchronous dynamic random access memory, or other types of persistent storage.

In an embodiment, the memory interface 1870 implements an HBM2 memory interface and Y equals half U. In an embodiment, the HBM2 memory stacks are located on the same physical package as the PPU 1700, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 1704 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 1700 process very large datasets and/or run applications for extended periods.

In an embodiment, the PPU 1700 implements a multi-level memory hierarchy. In an embodiment, the memory partition unit 1780 supports a unified memory to provide a single unified virtual address space for CPU and PPU 1700 memory, enabling data sharing between virtual memory systems. In an embodiment the frequency of accesses by a PPU 1700 to memory located on other processors is traced to ensure that memory pages are moved to the physical memory of the PPU 1700 that is accessing the pages more frequently. In an embodiment, the NVLink 1710 supports address translation services allowing the PPU 1700 to directly access a CPU's page tables and providing full access to CPU memory by the PPU 1700.

In an embodiment, copy engines transfer data between multiple PPUs 1700 or between PPUs 1700 and CPUs. The copy engines can generate page faults for addresses that are not mapped into the page tables. The memory partition unit 1780 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 1704 or other system memory may be fetched by the memory partition unit 1780 and stored in the L2 cache 1860, which is located on-chip and is shared between the various GPCs 1750. As shown, each memory partition unit 1780 includes a portion of the L2 cache 1860 associated with a corresponding memory device 1704. Lower level caches may then be implemented in various units within the GPCs 1750. For example, each of the SMs 1840 may implement a level one (L1) cache. The L1 cache is private memory that is dedicated to a particular SM 1840. Data from the L2 cache 1860 may be fetched and stored in each of the L1 caches for processing in the functional units of the SMs 1840. The L2 cache 1860 is coupled to the memory interface 1870 and the XBar 1770.

The ROP unit 1850 performs graphics raster operations related to pixel color, such as color compression, pixel blending, and the like. The ROP unit 1850 also implements depth testing in conjunction with the raster engine 1825, receiving a depth for a sample location associated with a pixel fragment from the culling engine of the raster engine 1825. The depth is tested against a corresponding depth in a depth buffer for a sample location associated with the fragment. If the fragment passes the depth test for the sample location, then the ROP unit 1850 updates the depth buffer and transmits a result of the depth test to the raster engine 1825. It will be appreciated that the number of partition units 1780 may be different than the number of GPCs 1750 and, therefore, each ROP unit 1850 may be coupled to each of the GPCs 1750. The ROP unit 1850 tracks packets received from the different GPCs 1750 and determines which GPC 1750 that a result generated by the ROP unit 1850 is routed to through the Xbar 1770. Although the ROP unit 1850 is included within the memory partition unit 1780 in FIG. 18B, in other embodiments, the ROP unit 1850 may be outside of the memory partition unit 1780. For example, the ROP unit 1850 may reside in the GPC 1750 or another unit.

Figure 19A:
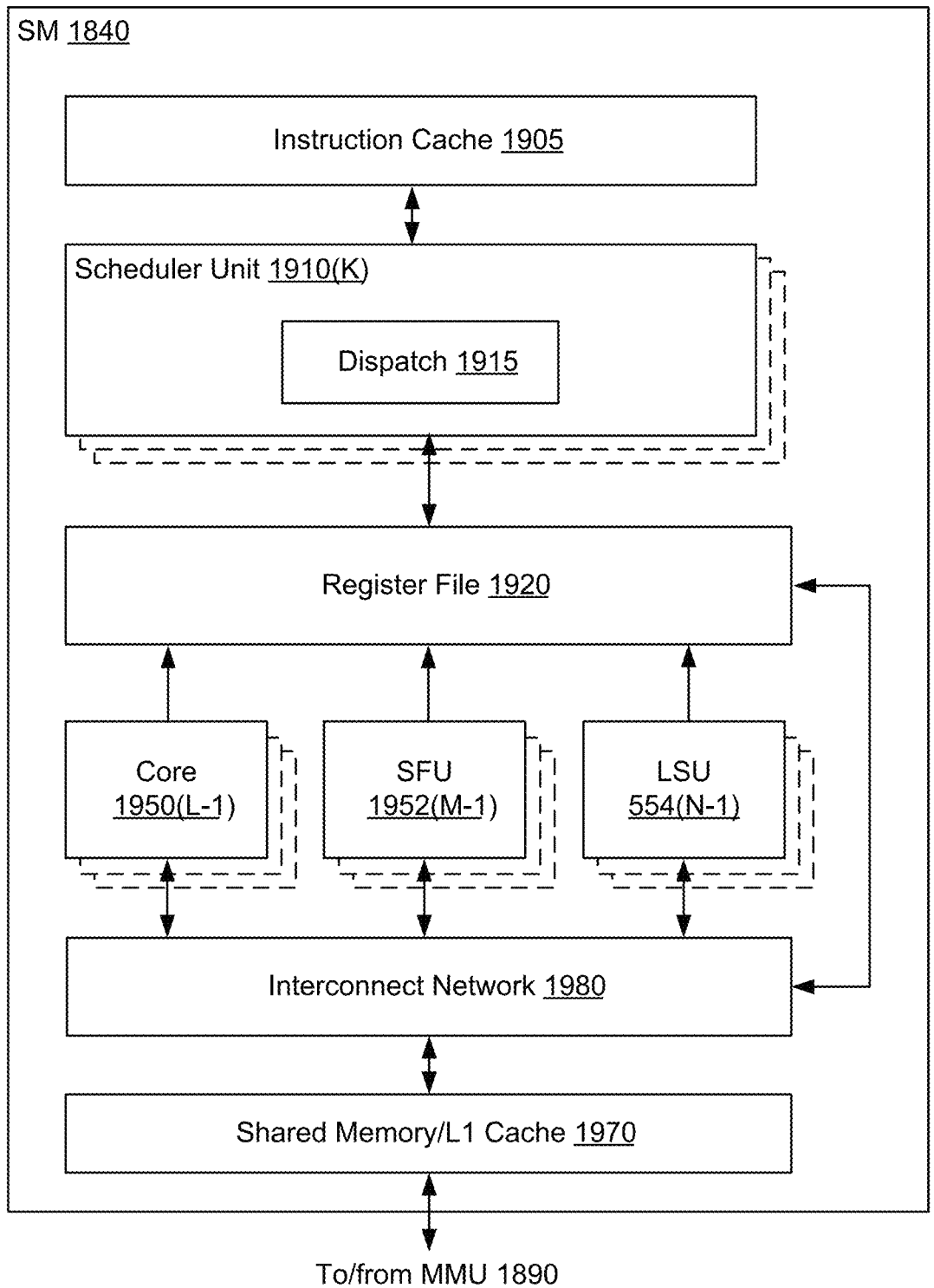
FIG. 19A illustrates the streaming multi-processor of FIG. 18A, in accordance with an embodiment.

FIG. 19A illustrates the streaming multi-processor 1840 of FIG. 18A, in accordance with an embodiment. As shown in FIG. 19A, the SM 1840 includes an instruction cache 1905, one or more scheduler units 1910, a register file 1920, one or more processing cores 1950, one or more special function units (SFUs) 1952, one or more load/store units (LSUs) 1954, an interconnect network 1980, a shared memory/L1 cache 1970.

As described above, the work distribution unit 1725 dispatches tasks for execution on the GPCs 1750 of the PPU 1700. The tasks are allocated to a particular DPC 1820 within a GPC 1750 and, if the task is associated with a shader program, the task may be allocated to an SM 1840. The scheduler unit 1910 receives the tasks from the work distribution unit 1725 and manages instruction scheduling for one or more thread blocks assigned to the SM 1840. The scheduler unit 1910 schedules thread blocks for execution as warps of parallel threads, where each thread block is allocated at least one warp. In an embodiment, each warp executes 32 threads. The scheduler unit 1910 may manage a plurality of different thread blocks, allocating the warps to the different thread blocks and then dispatching instructions from the plurality of different cooperative groups to the various functional units (i.e., cores 1950, SFUs 1952, and LSUs 1954) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 1915 is configured to transmit instructions to one or more of the functional units. In the embodiment, the scheduler unit 1910 includes two dispatch units 1915 that enable two different instructions from the same warp to be dispatched during each clock cycle. In alternative embodiments, each scheduler unit 1910 may include a single dispatch unit 1915 or additional dispatch units 1915.

Each SM 1840 includes a register file 1920 that provides a set of registers for the functional units of the SM 1840. In an embodiment, the register file 1920 is divided between each of the functional units such that each functional unit is allocated a dedicated portion of the register file 1920. In another embodiment, the register file 1920 is divided between the different warps being executed by the SM 1840. The register file 1920 provides temporary storage for operands connected to the data paths of the functional units.

Each SM 1840 comprises L processing cores 1950. In an embodiment, the SM 1840 includes a large number (e.g., 128, etc.) of distinct processing cores 1950. Each core 1950 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 1950 include 64 single-precision (32-bit) floating point cores, 64 integer cores, 32 double-precision (64-bit) floating point cores, and 8 tensor cores.

Tensor cores are configured to perform matrix operations, and, in an embodiment, one or more tensor cores are included in the cores 1950. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 1840 also comprises M SFUs 1952 that perform special functions (e.g., attribute evaluation, reciprocal square root, and the like). In an embodiment, the SFUs 1952 may include a tree traversal unit configured to traverse a hierarchical tree data structure. In an embodiment, the SFUs 1952 may include texture unit configured to perform texture map filtering operations. In an embodiment, the texture units are configured to load texture maps (e.g., a 2D array of texels) from the memory 1704 and sample the texture maps to produce sampled texture values for use in shader programs executed by the SM 1840. In an embodiment, the texture maps are stored in the shared memory/L1 cache 1870. The texture units implement texture operations such as filtering operations using mip-maps (i.e., texture maps of varying levels of detail). In an embodiment, each SM 1740 includes two texture units.

Each SM 1840 also comprises N LSUs 1954 that implement load and store operations between the shared memory/L1 cache 1970 and the register file 1920. Each SM 1840 includes an interconnect network 1980 that connects each of the functional units to the register file 1920 and the LSU 1954 to the register file 1920, shared memory/L1 cache 1970. In an embodiment, the interconnect network 1980 is a crossbar that can be configured to connect any of the functional units to any of the registers in the register file 1920 and connect the LSUs 1954 to the register file and memory locations in shared memory/L1 cache 1970.

The shared memory/L1 cache 1970 is an array of on-chip memory that allows for data storage and communication between the SM 1840 and the primitive engine 1835 and between threads in the SM 1840. In an embodiment, the shared memory/L1 cache 1970 comprises 128 KB of storage capacity and is in the path from the SM 1840 to the partition unit 1780. The shared memory/L1 cache 1970 can be used to cache reads and writes. One or more of the shared memory/L1 cache 1970, L2 cache 1860, and memory 1704 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1970 enables the shared memory/L1 cache 1970 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 17, are bypassed, creating a much simpler programming model. In the general purpose parallel computation configuration, the work distribution unit 1725 assigns and distributes blocks of threads directly to the DPCs 1820. The threads in a block execute the same program, using a unique thread ID in the calculation to ensure each thread generates unique results, using the SM 1840 to execute the program and perform calculations, shared memory/L1 cache 1970 to communicate between threads, and the LSU 1954 to read and write global memory through the shared memory/L1 cache 1970 and the memory partition unit 1780. When configured for general purpose parallel computation, the SM 1840 can also write commands that the scheduler unit 1720 can use to launch new work on the DPCs 1820.

The PPU 1700 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 1700 is embodied on a single semiconductor substrate. In another embodiment, the PPU 1700 is included in a system-on-a-chip (SoC) along with one or more other devices such as additional PPUs 1700, the memory 1704, a reduced instruction set computer (RISC) CPU, a memory management unit (MMU), a digital-to-analog converter (DAC), and the like.

In an embodiment, the PPU 1700 may be included on a graphics card that includes one or more memory devices 1704. The graphics card may be configured to interface with a PCIe slot on a motherboard of a desktop computer. In yet another embodiment, the PPU 1700 may be an integrated graphics processing unit (iGPU) or parallel processor included in the chipset of the motherboard.

Exemplary Computing System

Figure 19B:
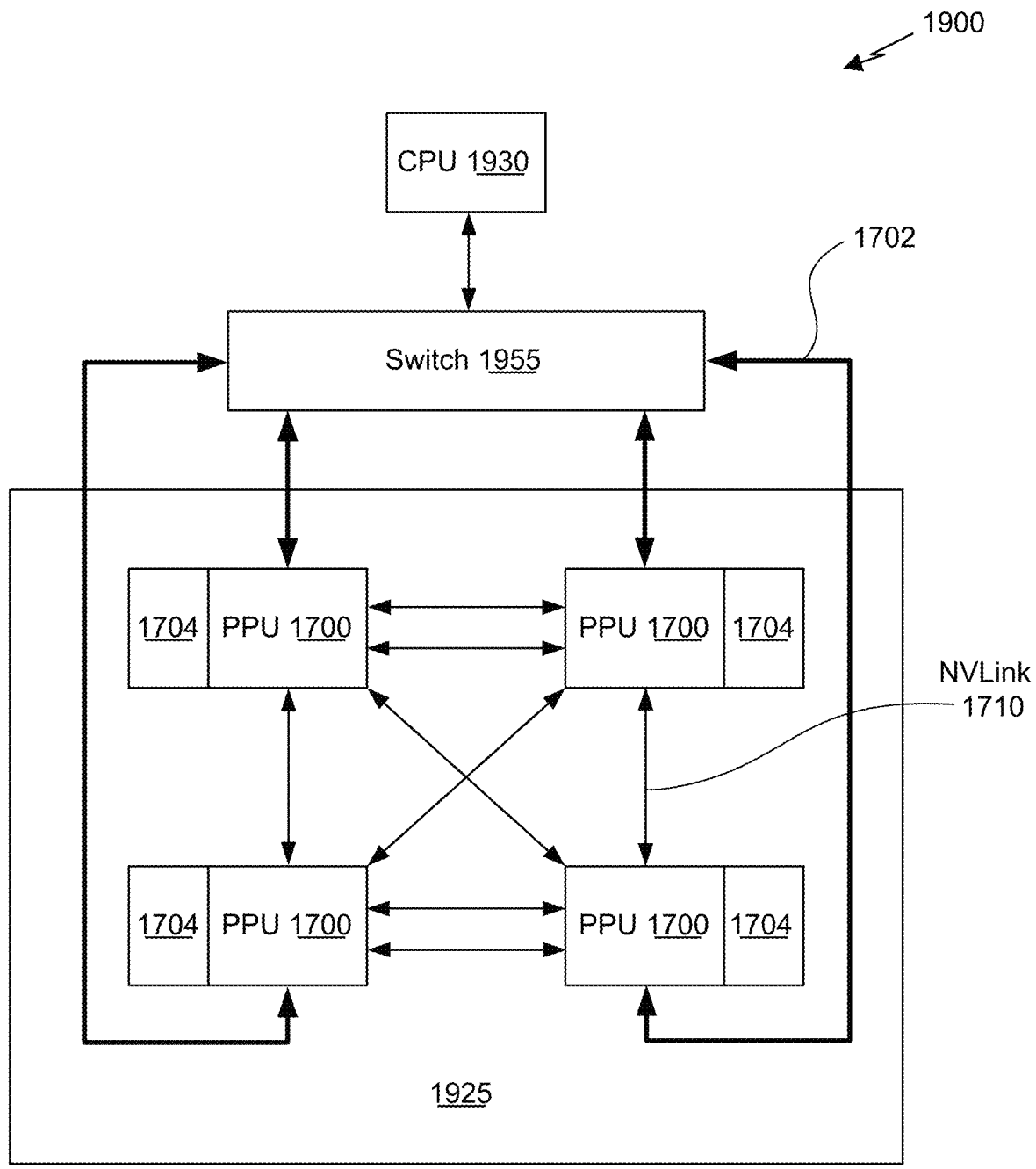
FIG. 19B is a conceptual diagram of a processing system implemented using the PPU of FIG. 17, in accordance with an embodiment.

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased FIG. 19B is a conceptual diagram of a processing system 1900 implemented using the PPU 1700 of FIG. 17, in accordance with an embodiment. The exemplary system 1965 may be configured to implement the method 200 shown in FIG. 2. The processing system 1900 includes a CPU 1930, switch 1955, and multiple PPUs 1700 each and respective memories 1704. The NVLink 1710 provides high-speed communication links between each of the PPUs 1700. Although a particular number of NVLink 1710 and interconnect 1702 connections are illustrated in FIG. 19B, the number of connections to each PPU 1700 and the CPU 1930 may vary. The switch 1955 interfaces between the interconnect 1702 and the CPU 1930. The PPUs 1700, memories 1704, and NVLinks 1710 may be situated on a single semiconductor platform to form a parallel processing module 1925. In an embodiment, the switch 1955 supports two or more protocols to interface between various different connections and/or links.

In another embodiment (not shown), the NVLink 1710 provides one or more high-speed communication links between each of the PPUs 1700 and the CPU 1930 and the switch 19555 interfaces between the interconnect 1702 and each of the PPUs 1700. The PPUs 1700, memories 1704, and interconnect 1702 may be situated on a single semiconductor platform to form a parallel processing module 1925. In yet another embodiment (not shown), the interconnect 1702 provides one or more communication links between each of the PPUs 1700 and the CPU 1930 and the switch 1955 interfaces between each of the PPUs 1700 using the NVLink 1710 to provide one or more high-speed communication links between the PPUs 1700. In another embodiment (not shown), the NVLink 1710 provides one or more high-speed communication links between the PPUs 1700 and the CPU 1930 through the switch 1955. In yet another embodiment (not shown), the interconnect 1702 provides one or more communication links between each of the PPUs 1700 directly. One or more of the NVLink 1710 high-speed communication links may be implemented as a physical NVLink interconnect or either an on-chip or on-die interconnect using the same protocol as the NVLink 1710.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1925 may be implemented as a circuit board substrate and each of the PPUs 1700 and/or memories 1704 may be packaged devices. In an embodiment, the CPU 1930, switch 1910, and the parallel processing module 1925 are situated on a single semiconductor platform.

In an embodiment, the signaling rate of each NVLink 1710 is 20 to 25 Gigabits/second and each PPU 1700 includes six NVLink 1710 interfaces (as shown in FIG. 19B, five NVLink 1710 interfaces are included for each PPU 1700). Each NVLink 1710 provides a data transfer rate of 25 Gigabytes/second in each direction, with six links providing 1700 Gigabytes/second. The NVLinks 1710 can be used exclusively for PPU-to-PPU communication as shown in FIG. 19B, or some combination of PPU-to-PPU and PPU-to-CPU, when the CPU 1930 also includes one or more NVLink 1710 interfaces.

In an embodiment, the NVLink 1710 allows direct load/store/atomic access from the CPU 1930 to each PPU's 1700 memory 1704. In an embodiment, the NVLink 1710 supports coherency operations, allowing data read from the memories 1704 to be stored in the cache hierarchy of the CPU 1930, reducing cache access latency for the CPU 1930. In an embodiment, the NVLink 1710 includes support for Address Translation Services (ATS), allowing the PPU 1700 to directly access page tables within the CPU 1930. One or more of the NVLinks 1710 may also be configured to operate in a low-power mode.

Figure 19C:
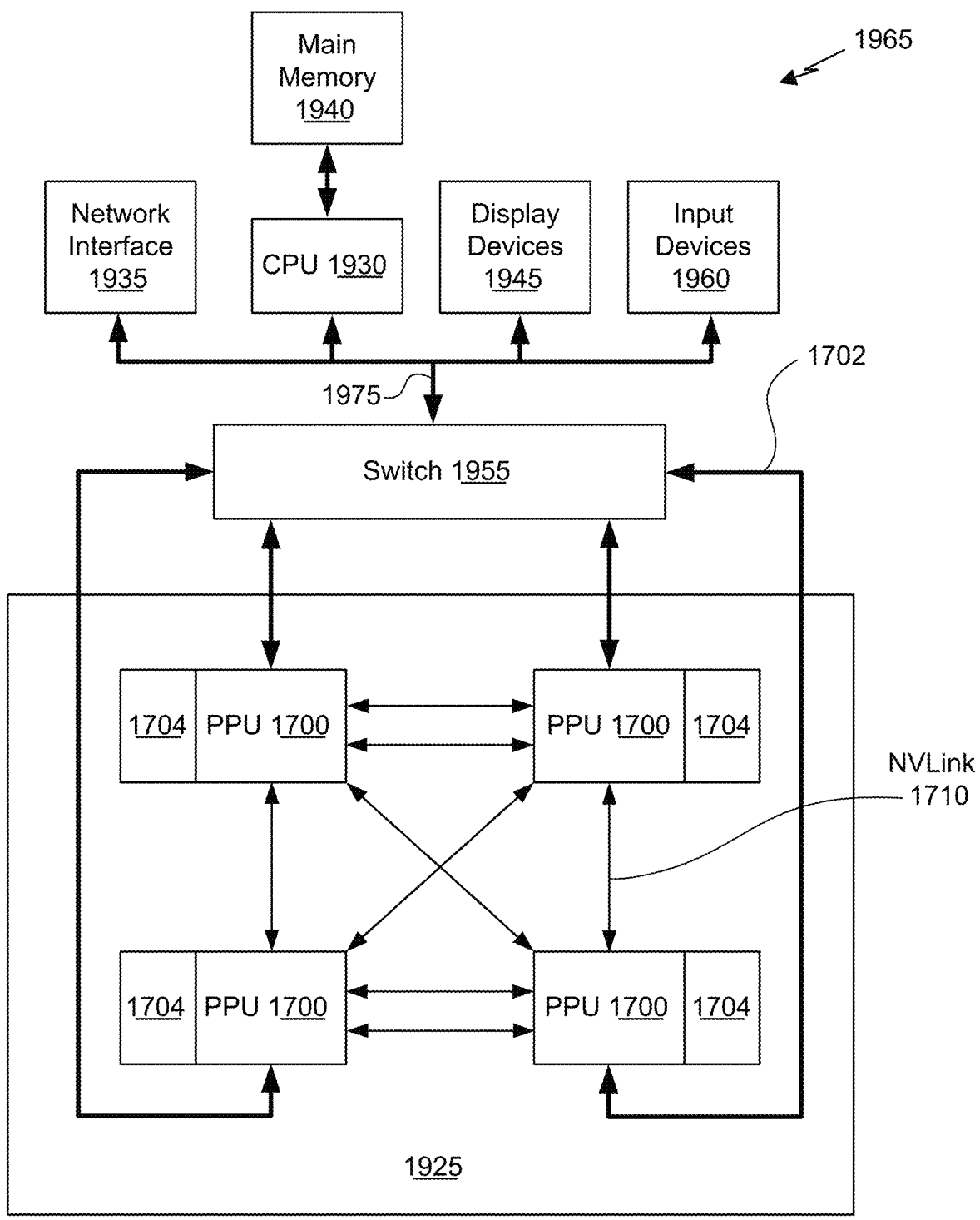
FIG. 19C illustrates an exemplary system in which the various architecture and/or functionality of the various previous embodiments may be implemented.

FIG. 19C illustrates an exemplary system 1965 in which the various architecture and/or functionality of the various previous embodiments may be implemented. The exemplary system 1965 may be configured to implement the method 100 shown in FIG. 1A.

As shown, a system 1965 is provided including at least one central processing unit 1930 that is connected to a communication bus 1975. The communication bus 1975 may be implemented using any suitable protocol, such as PCI (Peripheral Component Interconnect), PCI-Express, AGP (Accelerated Graphics Port), HyperTransport, or any other bus or point-to-point communication protocol(s). The system 1965 also includes a main memory 1940. Control logic (software) and data are stored in the main memory 1940 which may take the form of random access memory (RAM).

The system 1965 also includes input devices 1960, the parallel processing system 1925, and display devices 1945, i.e. a conventional CRT (cathode ray tube), LCD (liquid crystal display), LED (light emitting diode), plasma display or the like. User input may be received from the input devices 1960, e.g., keyboard, mouse, touchpad, microphone, and the like. Each of the foregoing modules and/or devices may even be situated on a single semiconductor platform to form the system 1965. Alternately, the various modules may also be situated separately or in various combinations of semiconductor platforms per the desires of the user.

Further, the system 1965 may be coupled to a network (e.g., a telecommunications network, local area network (LAN), wireless network, wide area network (WAN) such as the Internet, peer-to-peer network, cable network, or the like) through a network interface 1935 for communication purposes.

The system 1965 may also include a secondary storage (not shown). The secondary storage 2010 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1940 and/or the secondary storage. Such computer programs, when executed, enable the system 1965 to perform various functions. The memory 1940, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 1965 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 1700 comprises a graphics processing unit (GPU). The PPU 1700 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 1700 can be configured to process the graphics primitives to generate a frame buffer (i.e., pixel data for each of the pixels of the display).

An application writes model data for a scene (i.e., a collection of vertices and attributes) to a memory such as a system memory or memory 1704. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 1840 of the PPU 1700 including one or more of a vertex shader, hull shader, domain shader, geometry shader, and a pixel shader. For example, one or more of the SMs 1840 may be configured to execute a vertex shader program that processes a number of vertices defined by the model data. In an embodiment, the different SMs 1840 may be configured to execute different shader programs concurrently. For example, a first subset of SMs 1840 may be configured to execute a vertex shader program while a second subset of SMs 1840 may be configured to execute a pixel shader program. The first subset of SMs 1840 processes vertex data to produce processed vertex data and writes the processed vertex data to the L2 cache 1860 and/or the memory 1704. After the processed vertex data is rasterized (i.e., transformed from three-dimensional data into two-dimensional data in screen space) to produce fragment data, the second subset of SMs 1840 executes a pixel shader to produce processed fragment data, which is then blended with other processed fragment data and written to the frame buffer in memory 1704. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 20:
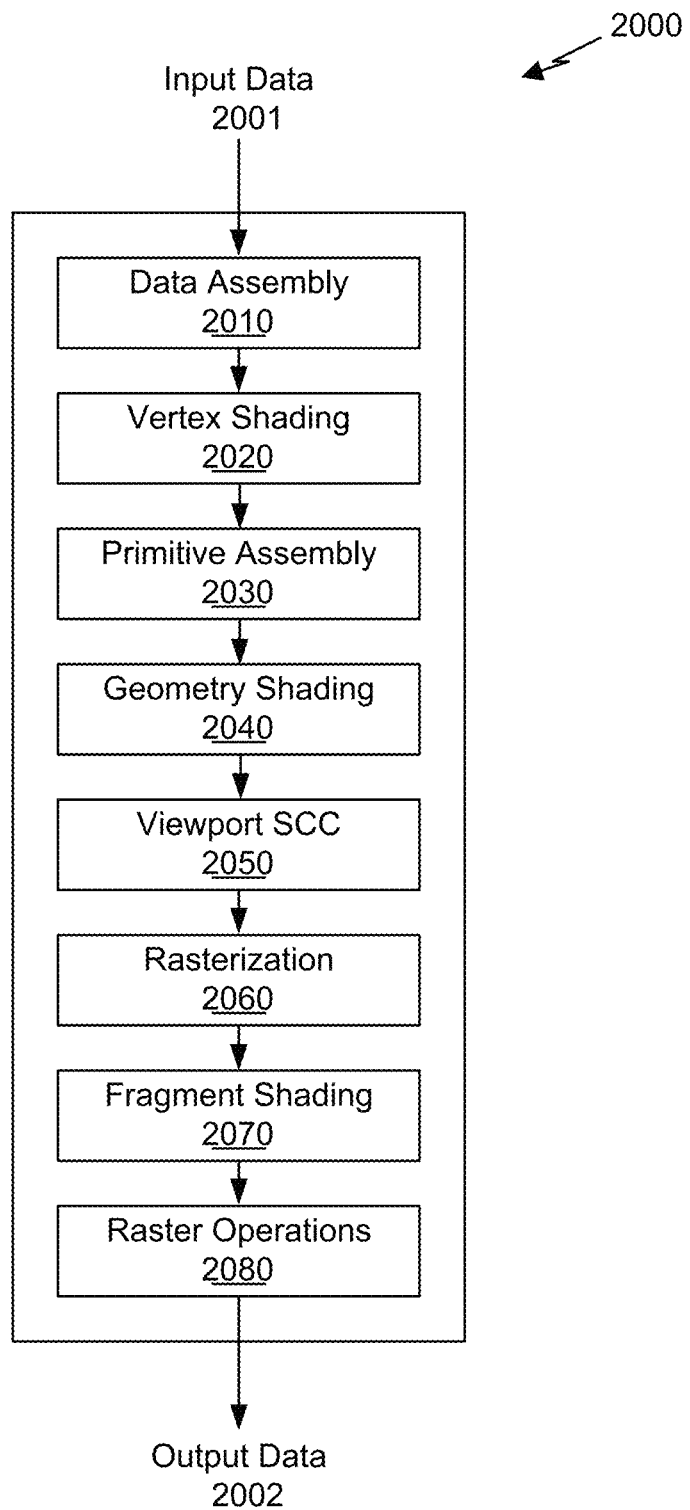
FIG. 20 is a conceptual diagram of a graphics processing pipeline implemented by the PPU of FIG. 17, in accordance with an embodiment.

FIG. 20 is a conceptual diagram of a graphics processing pipeline 2000 implemented by the PPU 1700 of FIG. 17, in accordance with an embodiment. The graphics processing pipeline 2000 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 2000 receives input data 2001 that is transmitted from one stage to the next stage of the graphics processing pipeline 2000 to generate output data 2002. In an embodiment, the graphics processing pipeline 2000 may represent a graphics processing pipeline defined by the OpenGL® API. As an option, the graphics processing pipeline 2000 may be implemented in the context of the functionality and architecture of the previous Figures and/or any subsequent Figure(s).

As shown in FIG. 20, the graphics processing pipeline 2000 comprises a pipeline architecture that includes a number of stages. The stages include, but are not limited to, a data assembly stage 2010, a vertex shading stage 2020, a primitive assembly stage 2030, a geometry shading stage 2040, a viewport scale, cull, and clip (VSCC) stage 2050, a rasterization stage 2060, a fragment shading stage 2070, and a raster operations stage 2080. In an embodiment, the input data 2001 comprises commands that configure the processing units to implement the stages of the graphics processing pipeline 2000 and geometric primitives (e.g., points, lines, triangles, quads, triangle strips or fans, etc.) to be processed by the stages. The output data 2002 may comprise pixel data (i.e., color data) that is copied into a frame buffer or other type of surface data structure in a memory.

The data assembly stage 2010 receives the input data 2001 that specifies vertex data for high-order surfaces, primitives, or the like. The data assembly stage 2010 collects the vertex data in a temporary storage or queue, such as by receiving a command from the host processor that includes a pointer to a buffer in memory and reading the vertex data from the buffer. The vertex data is then transmitted to the vertex shading stage 2020 for processing.

The vertex shading stage 2020 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 2020 may manipulate individual vertex attributes such as position, color, texture coordinates, and the like. In other words, the vertex shading stage 2020 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 2020 generates transformed vertex data that is transmitted to the primitive assembly stage 2030.

The primitive assembly stage 2030 collects vertices output by the vertex shading stage 2020 and groups the vertices into geometric primitives for processing by the geometry shading stage 2040. For example, the primitive assembly stage 2030 may be configured to group every three consecutive vertices as a geometric primitive (i.e., a triangle) for transmission to the geometry shading stage 2040. In some embodiments, specific vertices may be reused for consecutive geometric primitives (e.g., two consecutive triangles in a triangle strip may share two vertices). The primitive assembly stage 2030 transmits geometric primitives (i.e., a collection of associated vertices) to the geometry shading stage 2040.

The geometry shading stage 2040 processes geometric primitives by performing a set of operations (i.e., a geometry shader or program) on the geometric primitives. Tessellation operations may generate one or more geometric primitives from each geometric primitive. In other words, the geometry shading stage 2040 may subdivide each geometric primitive into a finer mesh of two or more geometric primitives for processing by the rest of the graphics processing pipeline 2000. The geometry shading stage 2040 transmits geometric primitives to the viewport SCC stage 2050.

In an embodiment, the graphics processing pipeline 2000 may operate within a streaming multiprocessor and the vertex shading stage 2020, the primitive assembly stage 2030, the geometry shading stage 2040, the fragment shading stage 2070, and/or hardware/software associated therewith, may sequentially perform processing operations. Once the sequential processing operations are complete, in an embodiment, the viewport SCC stage 2050 may utilize the data. In an embodiment, primitive data processed by one or more of the stages in the graphics processing pipeline 2000 may be written to a cache (e.g. L1 cache, a vertex cache, etc.). In this case, in an embodiment, the viewport SCC stage 2050 may access the data in the cache. In an embodiment, the viewport SCC stage 2050 and the rasterization stage 2060 are implemented as fixed function circuitry.

The viewport SCC stage 2050 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 2060.

The rasterization stage 2060 converts the 3D geometric primitives into 2D fragments (e.g. capable of being utilized for display, etc.). The rasterization stage 2060 may be configured to utilize the vertices of the geometric primitives to setup a set of plane equations from which various attributes can be interpolated. The rasterization stage 2060 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 2060 generates fragment data (i.e., interpolated vertex attributes associated with a particular sample location for each covered pixel) that are transmitted to the fragment shading stage 2070.

The fragment shading stage 2070 processes fragment data by performing a set of operations (i.e., a fragment shader or a program) on each of the fragments. The fragment shading stage 2070 may generate pixel data (i.e., color values) for the fragment such as by performing lighting operations or sampling texture maps using interpolated texture coordinates for the fragment. The fragment shading stage 2070 generates pixel data that is transmitted to the raster operations stage 2080.

The raster operations stage 2080 may perform various operations on the pixel data such as performing alpha tests, stencil tests, and blending the pixel data with other pixel data corresponding to other fragments associated with the pixel. When the raster operations stage 2080 has finished processing the pixel data (i.e., the output data 2002), the pixel data may be written to a render target such as a frame buffer, a color buffer, or the like.

It will be appreciated that one or more additional stages may be included in the graphics processing pipeline 2000 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 2040). Other types of graphics processing pipelines are contemplated as being within the scope of the present disclosure. Furthermore, any of the stages of the graphics processing pipeline 2000 may be implemented by one or more dedicated hardware units within a graphics processor such as PPU 1700. Other stages of the graphics processing pipeline 2000 may be implemented by programmable hardware units such as the SM 1840 of the PPU 1700.

The graphics processing pipeline 2000 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 1700. The API provides an abstraction for a programmer that lets a programmer utilize specialized graphics hardware, such as the PPU 1700, to generate the graphical data without requiring the programmer to utilize the specific instruction set for the PPU 1700. The application may include an API call that is routed to the device driver for the PPU 1700. The device driver interprets the API call and performs various operations to respond to the API call. In some instances, the device driver may perform operations by executing instructions on the CPU. In other instances, the device driver may perform operations, at least in part, by launching operations on the PPU 1700 utilizing an input/output interface between the CPU and the PPU 1700. In an embodiment, the device driver is configured to implement the graphics processing pipeline 2000 utilizing the hardware of the PPU 1700.

Various programs may be executed within the PPU 1700 in order to implement the various stages of the graphics processing pipeline 2000. For example, the device driver may launch a kernel on the PPU 1700 to perform the vertex shading stage 2020 on one SM 1840 (or multiple SMs 1840). The device driver (or the initial kernel executed by the PPU 1800) may also launch other kernels on the PPU 1800 to perform other stages of the graphics processing pipeline 2000, such as the geometry shading stage 2040 and the fragment shading stage 2070. In addition, some of the stages of the graphics processing pipeline 2000 may be implemented on fixed unit hardware such as a rasterizer or a data assembler implemented within the PPU 1800. It will be appreciated that results from one kernel may be processed by one or more intervening fixed function hardware units before being processed by a subsequent kernel on an SM 1840.

Machine Learning

Deep neural networks (DNNs) developed on processors, such as the PPU 1700 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 1700. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 1700 is a computing platform capable of delivering performance required for deep neural network-based artificial intelligence and machine learning applications.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:
1. An integrated circuit comprising:
a substrate;
one or more processing cores disposed on the substrate;
an analog to digital converter (ADC) disposed on the substrate and configured to receive input signals rep- resenting voltages and/or currents being supplied to the substrate, the ADC generating a digital output signal; and power management circuitry configured to, in response to the digital output signal from the ADC, generate one or more signals to control power being supplied to the substrate.

2. The integrated circuit according to claim 1, further comprising an interface connecting the ADC to a multiplexer located externally to the substrate, the ADC being further configured to receive, via the interface, said input signals from a plurality of input power sources.

3. The integrated circuit according to claim 2, wherein the ADC is further configured to receive, via the interface, said input signals from the plurality of input power sources in a time-division-multiplexed input power information signal.

4. The integrated circuit according to claim 1, wherein the power management circuitry comprises power sensing circuitry and power control actuation circuitry arranged on the substrate,
wherein the power sensing circuitry is configured to monitor power usage conditions based on the digital output signal from the ADC, and
wherein the power control actuation circuitry is configured to, based upon the monitored power usage conditions, generate the one or more signals to control said power being supplied to the substrate.

5. The integrated circuit according to claim 4, wherein the power sensing circuitry comprises an ADC control circuitry configured to transmit a signal selecting one of a plurality of input power sources for inclusion in a time-division-multiplexed signal comprising sampling information of said power being supplied to the substrate.

6. The integrated circuit according to claim 5, wherein the ADC control circuitry is configured to transmit said signal selecting one of a plurality of input power sources based on a condition detected on the substrate.

7. The integrated circuit according to claim 4, wherein the power control actuation circuitry is further configured to, responsive to the monitored power usage conditions, selectively perform adjustment of a frequency and/or voltage.

8. The integrated circuit according to claim 7, wherein the power control actuation circuitry is further configured to perform said adjustment of a voltage in accordance with a fixed slew rate.

9. The integrated circuit according to claim 7, wherein the power control actuation circuitry is further configured to, adjust a power received by the substrate by, adjusting the voltage to reach a predetermined minimum voltage, and adjusting a frequency.

10. The integrated circuit according to claim 7, wherein the power control actuation circuitry is further configured to generate an interrupt to trigger software-controlled power management.

11. The integrated circuit according to claim 10, further configured to provide the software-controlled power management with statistics related to current, voltage and/or power accumulated over a time window on the substrate.

12. The integrated circuit according to claim 7, wherein the monitored power usage conditions include current and voltage received from each of a plurality of power sources, and power numbers computed from said current and voltage.

13. The integrated circuit according to claim 12, wherein the monitored power usage conditions further include said current, said voltage and/or said power numbers accumulated over a time window.

14. The integrated circuit according to claim 12, wherein the monitored power usage conditions include one or more block activity measurements for one or more circuits on the substrate.

15. The integrated circuit according to claim 14, further comprising an asynchronous first-in-first-out (FIFO) storage, wherein output from the ADC operating in a first clock domain is input to the asynchronous FIFO, and wherein data from the asynchronous FIFO is received by the power sensing circuitry operating in a second clock domain that is different from the first clock domain.

16. The integrated circuit according to claim 1 configured as a graphics processing unit (GPU).

17. A system comprising:
an integrated circuit comprising:
a substrate;
one or more processing cores disposed on the substrate;
an analog to digital converter (ADC) disposed on the substrate and configured to receive input signals representing voltages and/or currents being supplied to the substrate, the ADC generating a digital output signal; and
power management circuitry configured to, in response to the digital output signal from the ADC, generate one or more signals to control power being supplied to the substrate; and
a multiplexer, arranged externally to the substrate, and configured to time-division-multiplex said current and/or voltage information from a plurality of input power sources.

18. The system according to claim 17, the integrated circuit being configured as a graphics processing unit (GPU).

19. The system according to claim 18, further comprising a voltage regulator configured to, in response to said one or more signals to control the power being supplied to the integrated circuit generated by the power management circuitry, change an output voltage and/or current supplied to the GPU.

20. A method for protecting an integrated circuit, having one or more processing cores disposed on a substrate, from overcurrent, the method comprising:
receiving, using an analog to digital converter (ADC) disposed on the substrate, input signals representing voltages and/or currents being supplied to the substrate;
generating, by the ADC in response to the received input signal, a digital output signal; and
in response to the digital output signal from the ADC, transmitting one or more signals to control power being supplied to the substrate.

21. An integrated circuit comprising:
a semiconductor substrate;
a selection controller disposed on the substrate, the selection controller generating a selection control signal that selects between analog signals representing power supply voltages and/or currents;
an analog to digital converter (ADC) disposed on the substrate, the ADC generating digital outputs in response to analog signals selected based on the selection control signal;
a clock generator that generates clocking signals; and
a power management processor disposed on the substrate and operatively coupled to the selection controller, the ADC and the clock generator, the power management processor, in response to the digital outputs generated by the ADC, controls a frequency of the clocking signals and at least one voltage level supplied to the substrate.

\* \* \* \* \*